(12) United States Patent
Sandberg et al.

(10) Patent No.: US 11,411,589 B2
(45) Date of Patent: Aug. 9, 2022

(54) INTERFERENCE SUPPRESSION FOR MULTI-USER MULTIPLE-INPUT-MULTIPLE-OUTPUT (MU-MIMO) PRE-CODERS USING COORDINATION AMONG ONE OR MORE RADIO POINTS

(71) Applicant: CommScope Technologies LLC, Hickory, NC (US)

(72) Inventors: Stuart D. Sandberg, Acton, MA (US); Balaji B Raghothaman, Chester Springs, PA (US)

(73) Assignee: CommScope Technologies LLC, Hickory, NC (US)

(*) Notice: Subject to any disclaimer, the term of this patent is extended or adjusted under 35 U.S.C. 154(b) by 32 days.

(21) Appl. No.: 16/685,922

(22) Filed: Nov. 15, 2019

(65) Prior Publication Data

US 2020/0162117 A1 May 21, 2020

Related U.S. Application Data

(60) Provisional application No. 62/768,713, filed on Nov. 16, 2018.

(51) Int. Cl.
*H04B 1/10* (2006.01)
*H04B 17/336* (2015.01)
(Continued)

(52) U.S. Cl.
CPC ............. *H04B 1/10* (2013.01); *H04B 7/0452* (2013.01); *H04B 7/0456* (2013.01); *H04B 17/336* (2015.01)

(58) Field of Classification Search
CPC ...... H04B 1/10; H04B 17/336; H04B 7/0456; H04B 7/0452; H04B 17/327; H04B 7/024; H04W 52/42; H04W 52/367
See application file for complete search history.

(56) References Cited

U.S. PATENT DOCUMENTS 5,579,341 A 11/1996 Smith et al.
5,748,683 A 5/1998 Smith et al.
(Continued)

FOREIGN PATENT DOCUMENTS

EP 2315309 A1 4/2011
EP 2802089 B1 2/2019
(Continued)

OTHER PUBLICATIONS

International Searching Authority, "International Search Report and Written Opinion from PCT Application No. PCT/US2019/061849", from Foreign Counterpart to U.S. Appl. No. 16/685,922, dated Mar. 11, 2020, pp. 1-10, Published: WO.
(Continued)

*Primary Examiner* — Vineeta S Panwalkar
(74) *Attorney, Agent, or Firm* — Fogg & Powers LLC

(57) ABSTRACT

This disclosure relates to Multi-User Multiple-Input-Multiple-Output (MU-MIMO) (including without limitation Distributed MU-MIMO (D-MU-MIMO)) communication techniques that employ interference suppression (IS) precoding schemes (including, for example, precoding schemes that use local interference suppression and precoding schemes that use global interreference suppression).

26 Claims, 38 Drawing Sheets

(51) Int. Cl.
*H04B 7/0456* (2017.01)
*H04B 7/0452* (2017.01)

(56) References Cited

U.S. PATENT DOCUMENTS

| | | | |
|---|---|---|---|
| 7,027,770 B2 | 4/2006 | Judd et al. | |
| 7,079,869 B2 | 7/2006 | Aytur et al. | |
| 8,401,106 B2 | 3/2013 | Kangas et al. | |
| 9,225,484 B2 * | 12/2015 | Wang | H04L 5/0032 |
| 9,414,399 B2 | 8/2016 | Eyuboglu et al. | |
| 10,291,302 B2 * | 5/2019 | Hammarwall | H04B 7/065 |
| 10,461,825 B2 | 10/2019 | Sandberg et al. | |
| 2003/0228854 A1 | 12/2003 | Morris et al. | |
| 2004/0110469 A1 | 6/2004 | Judd et al. | |
| 2008/0150514 A1 | 6/2008 | Codreanu et al. | |
| 2009/0041148 A1 * | 2/2009 | Li | H04W 72/1257 |
| | | | 375/267 |
| 2009/0081955 A1 * | 3/2009 | Necker | H04W 16/04 |
| | | | 455/63.1 |
| 2010/0136902 A1 | 6/2010 | Barak et al. | |
| 2010/0278530 A1 | 11/2010 | Kummetz et al. | |
| 2011/0135308 A1 | 6/2011 | Tarlazzi et al. | |
| 2011/0201368 A1 | 8/2011 | Faccin et al. | |
| 2011/0223962 A1 | 9/2011 | Kuwahara et al. | |
| 2012/0008718 A1 | 1/2012 | Dabak et al. | |
| 2012/0033571 A1 | 2/2012 | Shimezawa et al. | |
| 2012/0177011 A1 | 7/2012 | Xi et al. | |
| 2012/0207084 A1 | 8/2012 | Seo et al. | |
| 2012/0257575 A1 | 10/2012 | Davydov et al. | |
| 2013/0044650 A1 | 2/2013 | Barker et al. | |
| 2013/0076565 A1 | 3/2013 | Lee et al. | |
| 2013/0095871 A1 | 4/2013 | Soriaga et al. | |
| 2013/0107916 A1 | 5/2013 | Liu et al. | |
| 2013/0188753 A1 | 7/2013 | Tarlazzi et al. | |
| 2013/0308693 A1 | 11/2013 | Li et al. | |
| 2014/0192918 A1 | 7/2014 | Park et al. | |
| 2014/0219255 A1 | 8/2014 | Eyuboglu et al. | |
| 2014/0219267 A1 | 8/2014 | Eyuboglu et al. | |
| 2014/0256341 A1 | 9/2014 | Nazar et al. | |
| 2014/0334402 A1 | 11/2014 | Chen et al. | |
| 2014/0355707 A1 * | 12/2014 | Kim | H04B 7/086 |
| | | | 375/267 |
| 2015/0016441 A1 | 1/2015 | Hanson et al. | |
| 2015/0270917 A1 * | 9/2015 | Roman | H04J 11/005 |
| | | | 370/329 |
| 2015/0358104 A1 | 12/2015 | Ohwatari et al. | |
| 2016/0006548 A1 | 1/2016 | Yang et al. | |
| 2016/0037550 A1 | 2/2016 | Barabell et al. | |
| 2016/0285530 A1 | 9/2016 | Panah et al. | |
| 2016/0345342 A1 | 11/2016 | Eyuboglu et al. | |
| 2017/0026915 A1 * | 1/2017 | Madan | H04W 52/146 |
| 2017/0135121 A1 | 5/2017 | Eyuboglu et al. | |
| 2017/0222698 A1 | 8/2017 | Lange | |
| 2018/0131423 A1 * | 5/2018 | Park | H04L 25/03891 |
| 2018/0183502 A1 | 6/2018 | Sandberg et al. | |
| 2019/0045493 A1 | 2/2019 | Kimura et al. | |
| 2019/0356364 A1 * | 11/2019 | Maamari | H04W 72/042 |
| 2020/0045585 A1 * | 2/2020 | Huang | H04L 12/4625 |

FOREIGN PATENT DOCUMENTS

| | | |
|---|---|---|
| KR | 101100116 B1 | 12/2011 |
| KR | 101587566 B1 | 2/2016 |
| WO | 9533350 A1 | 12/1995 |
| WO | 9629834 A1 | 9/1996 |
| WO | 9824256 A2 | 6/1998 |
| WO | 2012075137 A1 | 6/2012 |
| WO | 2016073885 A1 | 5/2016 |
| WO | 2016115545 A2 | 7/2016 |

OTHER PUBLICATIONS

European Patent Office, "Extended European Search Report from EP Application No. 19885055.4", from Foreign Counterpart to U.S. Appl. No. 16/685,922, dated Jun. 22, 2022, pp. 1 through 9, Published: EP.

* cited by examiner

200

```
┌─────────────────────────────────────────────────────────┐
│   PRECODE DATA STREAMS COMMUNICATED WITH UEs USING      │
│     INTERFERENCE SUPPRESSION (IS) PRECODING SCHEME      │
│                         202                             │
│   ┌─────────────────────────────────────────────────┐   │
│   │   CAP PEAK POWER AT EACH ANTENNA BY SCALING     │   │
│   │         ELEMENTS OF PRECODER MATRIX             │   │
│   │                    206                          │   │
│   └─────────────────────────────────────────────────┘   │
└─────────────────────────────────────────────────────────┘
                            │
                            ▼
┌─────────────────────────────────────────────────────────┐
│   WIRELESSLY COMMUNICATE PRECODED DATA STREAMS WITH     │
│   UEs USING MULTI-USER MULTI-INPUT-MULTI-OUTPUT (MU-MIMO)│
│                         204                             │
└─────────────────────────────────────────────────────────┘
```

FIG. 2

Comparison of All-analog (CB) and hybrid precoding (RF App 1) with All-digital Precoding

INTERFERENCE SUPPRESSION FOR MULTI-USER MULTIPLE-INPUT-MULTIPLE-OUTPUT (MU-MIMO) PRE-CODERS USING COORDINATION AMONG ONE OR MORE RADIO POINTS

CROSS-REFERENCE TO RELATED APPLICATION

This application claims the benefit of U.S. Provisional Patent Application Ser. No. 62/768,713, filed on Nov. 16, 2018, which is hereby incorporated herein by reference.

BACKGROUND

This disclosure relates to the use of Multi-User Multiple-Input-Multiple-Output (MU-MIMO) (including without limitation Distributed MU-MIMO (D-MU-MIMO)) communication techniques and, in particular, MU-MIMO communication techniques that employ an interference suppression (IS) precoding scheme using coordination among one or more radio points (including, for example, employing a global or local IS precoding scheme).

SUMMARY

One embodiment is directed to a base station system to provide wireless service to a plurality of items of user equipment (UEs). The system comprises a plurality of radio units. Each of the radio units comprises a respective array of antennas for wirelessly transmitting and receiving radio frequency signals with UE. The system is configured to use multi-user multi-input-multiple-output (MU-MIMO) to communicate with the UEs. The system is configured to use a precoder scheme employing interference suppression (IS).

Another embodiment is directed to a method of wirelessly communicating with a plurality of items of user equipment (UEs) using a plurality of radio units. Each of the radio units comprises a respective array of antennas for wirelessly transmitting and receiving radio frequency signals with the UEs. The method comprises precoding data streams communicated with UEs using an interference suppression (IS) precoding scheme and wirelessly communicating the pre-coded data streams with the UEs using multi-user multi-input-multiple-output (MU-MIMO).

Other embodiments are disclosed.

The details of various embodiments are set forth in the accompanying drawings and the description below. Other features and advantages will become apparent from the description, the drawings, and the claims.

DRAWINGS

FIG. 2 is a high-level flowchart illustrating one exemplary embodiment of a method of wirelessly communicating with a plurality of items of user equipment (UEs) using a base station.

Like reference numbers and designations in the various drawings indicate like elements.

DETAILED DESCRIPTION

A. EXAMPLE BASE STATION SYSTEM

The MU-MIMO communication techniques described here (including without limitation the D-MU-MIMO communication techniques) can be used with various types of base station systems that employ multiple distributed radio units (also referred to here as "radio points") to communicate with user equipment (UE). Each of the distributed radio units comprises a respective antenna array comprising multiple antennas. Likewise, each UE comprises a respective antenna array comprising multiple antennas. One example of such a base station system is described below in connection with FIG. 1. However, it is understood that other embodiments can be implemented in other ways.

Figure 1:
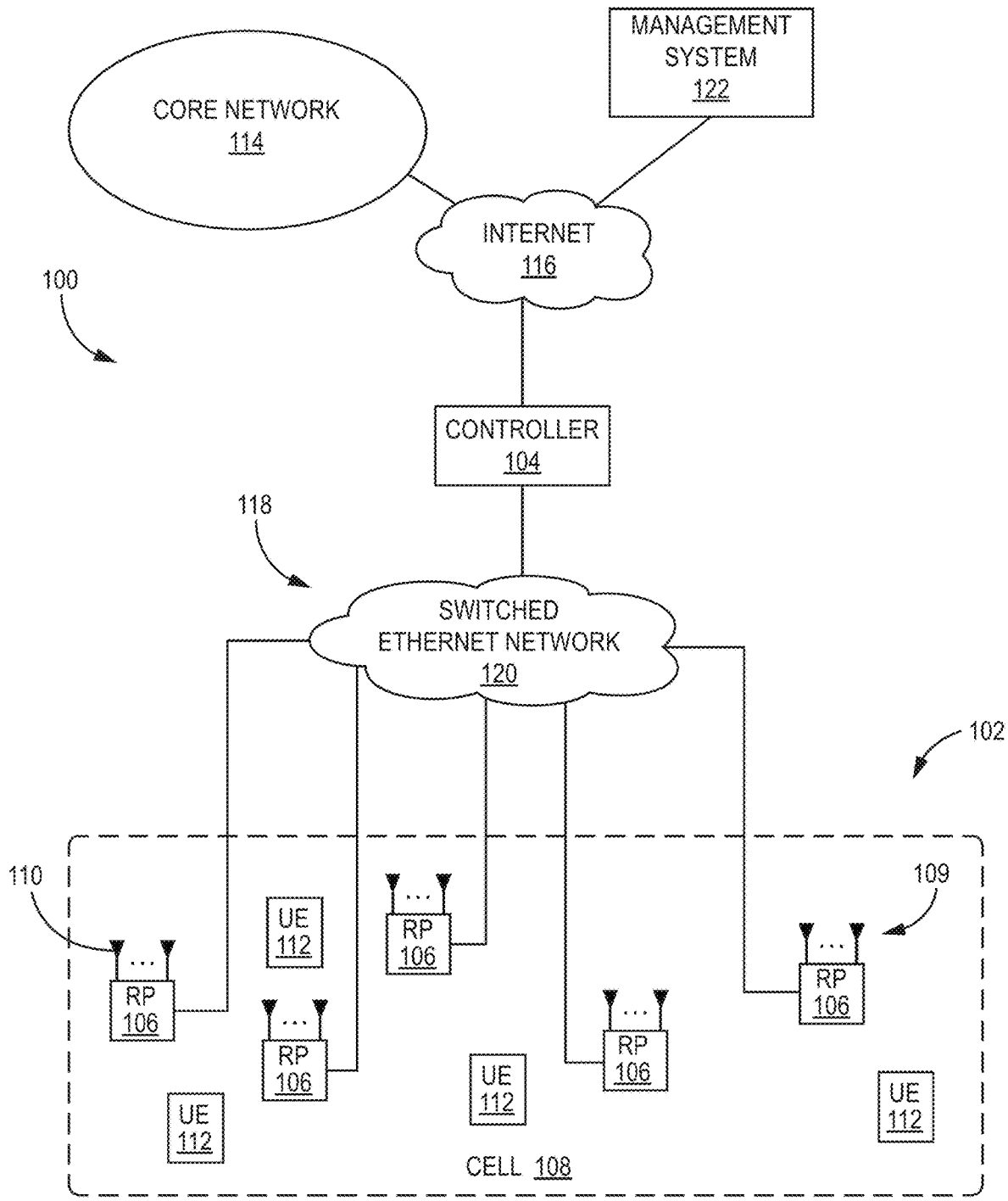
FIG. 1 is a block diagram illustrating one exemplary embodiment of a base station system in which the MU-MIMO communication techniques described here can be implemented.

FIG. 1 is a block diagram illustrating one exemplary embodiment of a base station system 100 in which the MU-MIMO communication techniques described here (including without limitation the D-MU-MIMO communication techniques) can be implemented. The system 100 is deployed at a site 102 to provide wireless coverage and capacity for one or more wireless network operators. The site 102 may be, for example, a building or campus or other grouping of buildings (used, for example, by one or more businesses, governments, or other enterprise entities) or some other public venue (such as a hotel, resort, amusement park, hospital, shopping center, airport, university campus, arena, or an outdoor area such as a ski area, stadium or a densely-populated downtown area).

In the exemplary embodiment shown in FIG. 1, the system 100 is implemented at least in part using a C-RAN architecture that employs at least one baseband unit 104 and multiple radio points (RPs) 106. The system 100 is also referred to here as a "C-RAN system" 100. Each RP 106 is remotely located from the baseband unit 104. Also, in this exemplary embodiment, at least one of the RPs 106 is remotely located from at least one other RP 106. The baseband unit 104 and RPs 106 serve at least one cell 108. The baseband units 104 are also referred to here as "baseband controllers" 104 or just "controllers" 104.

Each RP 106 includes or is coupled to an antenna array 109 comprising multiple antennas 110 via which downlink RF signals are radiated to user equipment (UE) 112 and via which uplink RF signals transmitted by UEs 112 are received. Various numbers of antennas 110 can be used (for example, thirty-two antennas 110).

The system 100 is coupled to the core network 114 of each wireless network operator over an appropriate back-haul. In the exemplary embodiment shown in FIG. 1, the Internet 116 is used for back-haul between the system 100 and each core network 114. However, it is to be understood that the back-haul can be implemented in other ways.

The exemplary embodiment of the system 100 shown in FIG. 1, and the MU-MIMO communication techniques described here (including without limitation the D-MU-MIMO communication techniques), are suitable for use any air interface that can use MU-MIMO (including, for example and without limitation, Long Term Evolution (LTE) and the Fifth Generation (5G) air interfaces).

In this embodiment, the controller 104 and RPs 106 together are used to implement an Evolved Node B (also referred to here as an "eNodeB" or "eNB") that is used to provide user equipment 112 with mobile access to the wireless network operator's core network 114 to enable the user equipment 112 to wirelessly communicate data and voice. This eNodeB can be a macro eNodeB or a home eNodeB (HeNB).

The controllers 104 and the radio points 106 can be implemented so as to use an air interface that supports one or more of frequency-division duplexing (FDD) and/or time-division duplexing (TDD). Moreover, the controllers 104 and/or the radio points 106 can be configured to support multiple air interfaces and/or to support multiple wireless operators.

Each controller 104 is communicatively coupled to the radio points 104 using a front-haul network 118. In the exemplary embodiment shown in FIG. 1, the front-haul 118 that communicatively couples each controller 104 to one or more RPs 106 is implemented using a standard switched ETHERNET network 120. However, it is to be understood that the front-haul between the controllers 104 and RPs 106 can be implemented in other ways.

The switched Ethernet network 120 comprises one or more Ethernet switches. Each controller 104 is communicatively coupled to one or more of the switches in the Ethernet network 120 via a respective one or more Ethernet links (only one of which is shown for ease of illustration). Each RP 106 is communicatively coupled to one or more of the switches in the Ethernet network 120 via a respective one or more Ethernet links (only one of which is shown for ease of illustration).

Generally, one or more nodes in a C-RAN perform analog radio frequency (RF) functions for the air interface as well as digital Layer 1, Layer 2, and Layer 3 (of the Open Systems Interconnection (OSI) model) functions for the air interface.

In the exemplary embodiment shown in (L1) FIG. 1, each baseband controller 104 comprises Layer-1 (L1) functionality, Layer-2 (L2) functionality, and Layer-3 (L3) functionality configured to perform at least some of the Layer-1 processing, Layer-2 processing, and Layer-3 processing, respectively, for the air interface implemented by the RAN system 100. Each RP 106 includes Layer-1 functionality that implements any Layer-1 processing for the air interface that is not performed in the controllers 104 and one or more radio frequency (RF) circuits (not shown) that implement the RF front-end functions for the air interface and the one or more antennas 110 associated with that RP 106.

Generally, for each cell 108 implemented by the C-RAN 100, the corresponding controller 104 performs the air-interface Layer-3 (L3) and Layer-2 (L2) processing as well as at least some of the air-interface Layer-1 (L1) processing for the cell 108, where each of the radio points 106 serving that cell 108 perform the L1 processing not performed by the controller 104 as well as implementing the analog RF transceiver functions.

Different splits in the air-interface processing between the controller 104 and the radio points 106 can be used. In one example, each baseband controller 104 can be configured to perform all of the digital Layer-1, Layer-2, and Layer-3 processing for the air interface, while the RPs 106 (specifically, the RF circuits) implement only the RF functions for the air interface and the antennas 108 associated with each RP 106. In that case, in-phase and quadrature (IQ) data representing time-domain symbols for each antenna is communicated between the controller 104 and the RPs 106. Other splits can be used and data can be communicated between the controllers 104 and the radio points 106 in other formats. In the following description, the fronthaul data communicated between the controllers 104 and the radio points 106 for the air interface is generally referred to as "IQ data" even though such fronthaul data can take many forms, including forms that are not IQ data.

Also, the form in which IQ data is communicated in the downlink direction (that is, the direction from the controller 104 to the RPs 106) can differ from the form in which IQ data is communicated in the uplink direction (that is, the direction from the RPs 106 to the controller 104). Also, for a given direction (downlink or uplink), not all fronthaul data needs to be communicated in the same form (that is, the fronthaul data for different channels or for different resource blocks can be communicated in different ways).

Data can be front-hauled between the controllers 104 and RPs 106 in other ways.

Each controller 104 and RP 106 (and the functionality described as being included therein), as well as the system 100 more generally, and any of the specific features described here as being implemented by any of the foregoing, can be implemented in hardware, software, or combinations of hardware and software, and the various implementations (whether hardware, software, or combinations of hardware and software) can also be referred to generally as "circuitry" or a "circuit" configured to implement at least some of the associated functionality. When implemented in software, such software can be implemented in software or firmware executing on one or more suitable programmable processors. Such hardware or software (or portions thereof) can be implemented in other ways (for example, in a field programmable gate array (FPGA), application specific integrated circuit (ASIC), etc.). Also, the RF functionality can be implemented using one or more RF integrated circuits (RFICs) and/or discrete components. Each controller 104 and RP 106, and the system 100 more generally, can be implemented in other ways.

In the exemplary embodiment shown in FIG. 1, a management system 122 is communicatively coupled to the controllers 104 and RPs 106, for example, via the Internet 116 and ETHERNET network 120 (in the case of the RPs 106).

In the exemplary embodiment shown in FIG. 1, the management system 122 communicates with the various elements of the system 100 using the Internet 116 and the ETHERNET network 120. Also, in some implementations, the management system 122 sends and receives management communications to and from the controllers 104, each of which in turn forwards relevant management communications to and from the RPs 106. The management system 122 can comprise a proprietary management system provided by the vendor of the C-RAN system 100 or a Home eNodeB management system (HeNB MS) (or other eNodeB management system) used by an operator to manage Home eNodeBs (or other eNodeBs) deployed in its network.

Each controller 104 can also implement a management interface by which a user is able to directly interact with the controller 104. This management interface can be implemented in various ways including, for example, by implementing a web server that serves web pages that implement a web-based graphical user interface for a user to interact with the controller 104 using a web browser and/or by implementing a command-line interface by which a user is able to interact with the controller 104, for example, using secure shell (SSH) software.

In the exemplary embodiment described here in connection with FIG. 1, a "signature vector" (SV) is determined for each UE 112. The signature vector is determined based on receive power measurements made at each of the RPs 106. When a UE 112 makes initial Physical Random Access Channel (PRACH) transmissions to access a cell 108 served by the C-RAN 100, one or more RPs 106 will receive those initial PRACH transmissions. Each RP 106 is configured to detect uplink PRACH transmissions that it has received (that is, each RP 106 is configured to detect when UEs 112 are attempting to access the associated cell 108). Each RP 106 is also configured to, when it determines that it has received a PRACH transmission from a UE 112, to determine a signal reception metric indicative of the power level of the received PRACH transmission as received by that RP 106 for that UE 112. One example of such a signal reception metric is a signal-to-noise plus interference ratio (SNIR). The initial version of the signature vector for each UE 112 is created based on the PRACH metrics for that UE 112.

The signature vector for each UE 112 is updated over the course of that UE's connection to the cell 108 based on Sounding Reference Signals (SRS) transmitted by the UE 112. A signal reception metric indicative of the power level of the SRS transmissions received by the RPs 106 (for example, a SNIR) is measured (or otherwise determined). The signal reception metrics that are determined based on the SRS transmissions are also referred to here as "SRS metrics." The updated versions of the signature vector for each UE 112 are created based on the SRS metrics for that UE 112.

Each signature vector is a set of signal-to-interference-plus-noise ratio (SINR) values (or other metric), with each value or element corresponding to a RP 106 used to serve the cell 108.

The signature vector can be used to determine the RP 106 having the best signal reception metric by scanning or sorting the elements of the signature vector to find the element having the best signal reception metric. The RP 106 that corresponds to that "best" element is also referred to here as the "primary RP 106" for the UE 112.

The signature vector (and the primary RP 106 determined therefrom) can be used to estimate the location of the UE 112. The signature vector can also be used to determine which RPs 106 should be used for interference suppression for the associated UE 112 and, when D-MU-MIMO is used, which RPs 106 should be used to transmit transport blocks intended for a given UE 112.

As noted above, FIG. 1 illustrates one exemplary embodiment of a base station system in which the MU-MIMO communication techniques described here (including without limitation the D-MU-MIMO communication techniques) can be used. However, the MU-MIMO communication techniques can be used in other systems that are implemented in other ways.

B. MU-MIMO COMMUNICATION TECHNIQUES

1. Summary/Abstract/Overview

In embodiments described here, smart interference suppression (IS) in MU-MIMO is used and offers the potential for large gains in rate, in comparison with MU-MIMO using conventional SVD precoding. The use of distributed D-MIMO further boosts the rate for smart IS, but does not appear to affect rate appreciably for conventional SVD precoding. Scaling the precoders to cap peak antenna element power does not result in significant rate reduction. Precoders using IS have a greater sensitivity to errors in the RP channel estimates, but even with −10 dB perturbations, the rate for precoders using IS was seen to be appreciably greater than that for conventional SVD precoding.

FIG. 2 is a high-level flowchart illustrating one exemplary embodiment of a method 200 of wirelessly communicating with a plurality of items of user equipment (UEs) using a base station. The embodiment of method 200 shown in FIG. 2 is described here as being implemented using the base station system 100 described above in connection with FIG. 1, though it is to be understood that other embodiments can be implemented in other ways.

The blocks of the flow diagram shown in FIG. 2 have been arranged in a generally sequential manner for ease of explanation; however, it is to be understood that this arrangement is merely exemplary, and it should be recognized that the processing associated with method 200 (and the blocks shown in FIG. 2) can occur in a different order (for example, where at least some of the processing associated with the blocks is performed in parallel and/or in an event-driven manner). Also, most standard exception handling is not described for ease of explanation; however, it is to be understood that method 200 can and typically would include such exception handling.

Method 200 can be performed for downlink communications and/or uplink communications.

Method 200 comprises precoding data streams communicated with UEs 112 using an interference suppression (IS) precoding scheme (block 202). As explained in more detailed below, the interference suppression precoding scheme can be a local interference suppression precoding scheme or a global interference suppression precoding scheme. Preferably, the precoder scheme is robust to errors in channel estimates used by the system. Also, as described in more detailed below, the data streams communicated with UEs 112 can be precoded using an interference suppression precoding scheme using all digital precoding, using all analog precoding, or using hybrid precoding that comprises digital precoding and analog precoding. One example of hybrid precoding involves using simplified hybrid precoding, where elements of a digital precoding matrix are constrained to all be zeros except for a block selected to maximize SINR. Another example of hybrid precoding involves using full hybrid precoding, where a digital precoding matrix is configured to maximize SINR.

Method 200 further comprises wirelessly communicating the precoded data streams with the UEs 112 using multi-user multi-input-multiple-output (MU-MIMO) (block 204). Wirelessly communicating the precoded data streams with the UEs 112 using MU-MIMO can involve wirelessly communicating the precoded data streams in a downlink channel to the UEs 112 using MU-MIMO or wirelessly communicating the precoded data streams in an uplink channel from the UEs 112 using MU-MIMO.

Wirelessly communicating the precoded data streams with the UEs 112 using MU-MIMO can involve, for a given time and frequency resource, using MU-MIMO to communicate with each of multiple subsets of the UEs 112 using only a respective one of the radio units 106 that is only used to communicate with that subset of the UEs 112 during the given time and frequency resource or using distributed MU-MIMO (D-MU-MIMO) to communicate with a subset of the UEs 112 using multiple radio units 106.

Method 200 (more specifically, the processing associated with block 202) optionally can further comprise capping peak power at each of the antennas 110 by scaling elements of a precoder matrix (block 206). Details about how this can be done are provided below.

In the case of downlink communications, the processing associated with method 200 can be performed in one or more units that implement the base station (for example, in one or more of the controller 104 and the radio points 106 in the example shown in FIG. 1). In the case of uplink communications, some of the processing associated with method 200 will be performed in the UEs 112 but other processing associated with block 202 can be performed in one or more units that implement the base station (for example, in one or more of the controller 104 and the radio points 106 in the example shown in FIG. 1).

2. Interference Suppression for MU-MIMO Precoders

Figure 3:
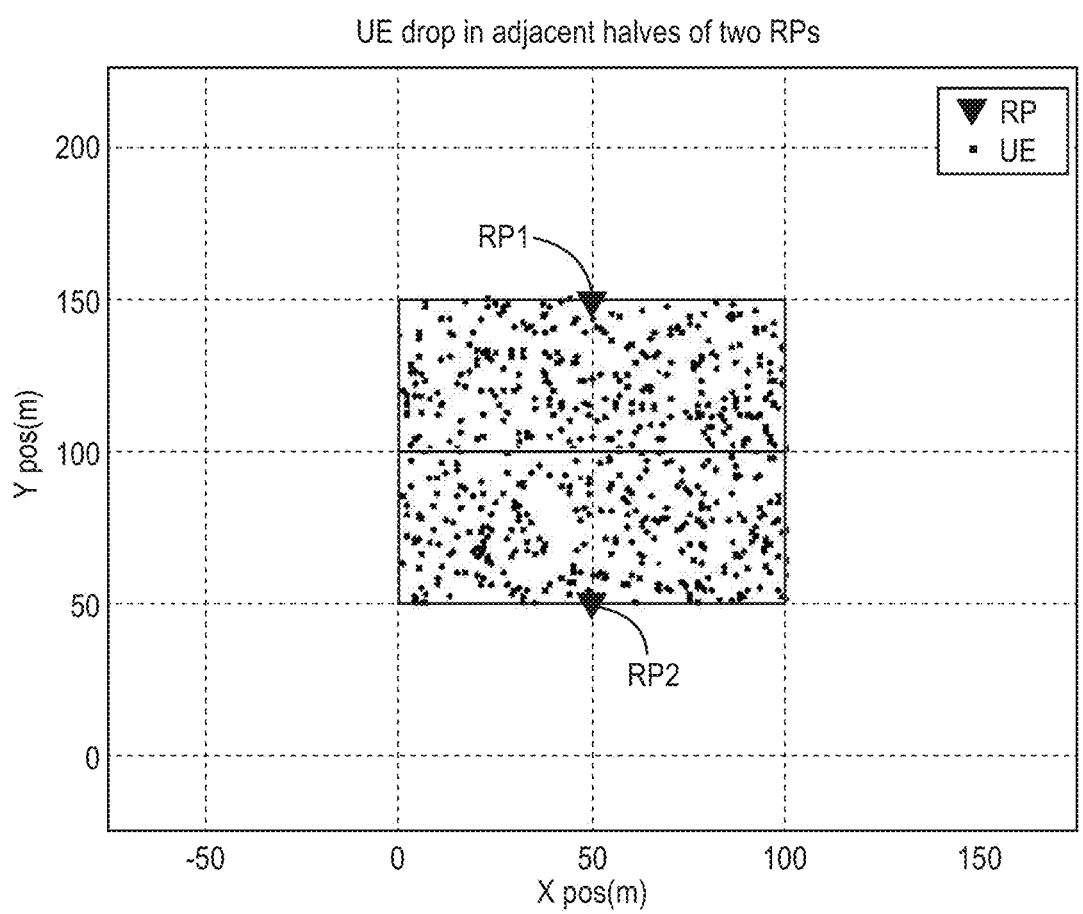
FIG. 3 illustrates a scenario in which MU-MIMO with frequency reuse is employed.

MU-MIMO with frequency reuse is considered for the simple scenario illustrated in FIG. 3, where UEs are in adjacent halves of the regions covered by two adjacent RPs and focus on downlink (DL) reuse. However, it is to be understood that the techniques discussed here can be used in other situations. For example, the techniques described here can be used in a more general scenario where a cell is served by more than two radio points. Also, the techniques described here can be used in the uplink (UL), with UEs using smart precoding in conjunction with RP/antenna combining at the controller and/or RPs.

On a given {time, frequency} resource pair, the RPs make simultaneous transmissions to K UEs using the antenna array at RP 1 and the antenna array at RP 2, each array having $N_t$ elements. Let $\theta_m$ denote the set of UEs that are closer to RP m than to the other RP.

The rank r transmission for a given UE consists of r QAM symbols each of unity m.s. value, and is represented by the rX1 vector x. The transmission to UE k is precoded with $N_t$Xr matrix $P^{\{k,m\}}$ at RP m, and the transmissions for the UEs are summed to provide the $N_t$x1 antenna input $$y^{\{m\}} = \sqrt{\gamma_{tot}/N_t} \sum_k P^{\{k,m\}} x^{\{k\}} \quad (1)$$

for RP m, where $\gamma_{tot}$ denotes total transmit power across the array. The $P^{\{k,m\}}$ are nominally normalized for unity average (across antenna elements) square value per element, and as a result the portion of total transmit power used for a given UE decreases as the number of UEs in reuse increases. [In Sections 2.3 and 3, the impact on performance to perform additional scale-back of the $P^{\{k,m\}}$ to cap the peak TX power in an antenna array element is examined.]

Each UE employs an array of $N_r$ antenna elements, and the reception for UE k is represented by the $N_r$X1 vector $$r^{\{k\}} = H^{\{k,1\}} y^{\{1\}} + H^{\{k,2\}} y^{\{2\}} + n^{\{k\}}, \quad (2)$$

where the $N_r$x$N_t$ matrix $H^{\{k,m\}}$ represents the channel from RP m to UE k, and $n^{\{k\}}$ represents AWGN with zero mean and co-variance matrix $\sigma^2 I$, uncorrelated with the transmissions. It is assumed the $H^{\{k,m\}}$ are known to the RPs, e.g., by way of measurements of UL SRS.

In the precoding approaches we shall discuss, if RP m makes transmissions of data $x^{\{k\}}$ only to UEs k ∈ $\theta_m$, the only coordination required between the RPs is an exchange of the lists of UEs to be scheduled, prior to each scheduling opportunity. If multiple RPs are allowed to make data transmissions to a given UE however, the RPs must also exchange the channel sets $H^{\{k,m\}}$ so that the precoders used by the RPs can be optimized jointly. When multiple RPs transmit to a given UE the transmission is effectively over a single antenna array with distributed elements, which is referred to as distributed MU-MIMO (D-MU-MIMO) transmission. Precoder schemes for D-MU-MIMO are developed in Section 2.2. We continue Section 2.1 with the development for (non-distributed) single-RP data transmission schemes.

2.1 MU-MIMO with Data Transmission from a Single RP

We first consider smart reuse schemes for which an RP transmits a data symbol vector x only to UEs that are closer to that RP than to the other RP, i.e., $P^{\{k,m\}}=0$ when UE k is not a member of $\theta_m$. With this consideration, the reception for UE k ∈ $\theta_1$ can be rewritten $$r^{\{k\}} = \sqrt{\gamma_{tot}/N_t} H^{\{k,1\}} P^{\{k,1\}} x^{\{k\}} + n^{\{k\}} + \quad (3)$$
$$\sqrt{\gamma_{tot}/N_t} \left( H^{\{k,1\}} \sum_{j \in \{\theta_1\} \setminus k\}} P^{\{j,1\}} x^{\{j\}} + H^{\{k,2\}} \sum_{j \in \theta_2} P^{\{j,2\}} x^{\{j\}} \right).$$

The first term $H^{\{k,1\}} P^{\{k,1\}} x^{\{k\}}$ on the RHS of (3) is signal. The terms on the second line are the interference received at UE k from data transmissions made to other UEs: the first sum is interference received from transmissions made to same-RP UEs j∈$\theta_1$ and the second sum is interference received from transmissions made to other-RP UEs j∈$\theta_2$.

Without consideration of reuse interference, the choice for precoder $P^{\{k,m\}}$ that maximizes the rate for UE k ∈ $\theta_m$ is $\hat{V}$, consisting of, after normalization, the first r columns of V in the SVD (singular-value decomposition) $H^{\{k,m\}}=USV'$. Equivalently, the columns of $\hat{V}$ are the normalized eigenvectors of $H^{\{k,m\}'}H^{\{k,m\}}$ corresponding to the r largest eigenvalues. Note however that the choice of precoder for UE k influences the level of interference received by other UEs. Let p denote an arbitrary column of UE k's precoder $P^{\{k,m\}}$, and $z^{\{j,k\}}$ the corresponding power received at UE j, summed across the $N_r$ receive antennas. This interference power can be written $$z^{\{j,k\}} = \left(\frac{\gamma_{tot}}{N_t}\right) p'(H^{\{j,m\}\prime} H^{\{j,m\}})p, \quad (4)$$

and summing across UEs j we get $$Z = \left(\frac{\gamma_{tot}}{N_t}\right) p' B p \quad (5)$$

for the total interference power generated by UE k, where $$B = \sum_{j \in \theta_1 \cup \theta_2 \setminus k} H^{\{j,m\}\prime} H^{\{j,m\}}. \quad (6)$$

Notice that if $P^{\{k,m\}}$ is constrained to be in the null space of interference matrix B, i.e., $P^{\{k,m\}} = \aleph(B)\alpha$ for some nXr matrix $\alpha$, the transmission to UE k will produce no interference to any of the other UEs. Here, n is the dimension of the null space of B, i.e., $\aleph(B)$ is an $N_t$Xn matrix. Given the constraint $P^{\{k,m\}} = \aleph(B)\alpha$, we could select $\alpha$ to maximize the rate for the equivalent constrained channel $H^{\{k,1\}} \aleph(B)$. The optimum choice for $\alpha$ would be $\hat{V}$ as before, but for the SVD $$H^{\{k,m\}} \aleph(B) = USV', \quad (7)$$

and the corresponding precoder for the actual channel $H^{\{k,m\}}$ is $$P^{\{k,m\}} = \aleph(B)\hat{V}. \quad (8)$$

While the precoder (8) does eliminate interference for the other UEs j≠k in reuse, constraining $P^{\{k,m\}}$ to be in the null-space of B generally increases the level of noise enhancement in UE k's receiver, with relatively greater enhancement for relatively small dimension n. The value for n decreases as the number of UEs in reuse and their ranks increases. In fact, with R UEs in reuse, each using rank r SM, the dimension n may become zero when $rR=N_T$, in which case the precoder (8) is the zero matrix.

Instead of requiring that $P^{\{k,m\}}$ be completely contained in the null space of B, we will allow at least some part of $P^{\{k,m\}}$ to be outside the null space, with weighting that maximizes an "SINR" metric. The metric we consider is $$SINR = \frac{\left(\frac{\gamma_{tot}}{N_t}\right) p' A p}{p'\left(\left(\frac{\gamma_{tot}}{N_t}\right) B + \sigma^2 I\right) p} \quad (9)$$

where $$A = H^{\{k,m\}\prime} H^{\{k,m\}}, \quad (10)$$

I is the identity matrix, and p is an arbitrary column of $P^{\{k,m\}}$, scaled for unity average square value. The numerator in (9) is the total power across UE k's antenna array arising from transmission to UE k with p. Referring to (5) it is seen that the denominator in (9) is the sum of the interference and noise powers, summed across the arrays of all UEs in reuse, the interference arising from transmission to UE k with p.

Rewrite (9) as $$SINR = \frac{p' A p}{p'(B + s^2 I) p} \quad (11)$$

where $$s^2 = \left(\frac{\sigma^2}{\gamma_{tot}/N_t}\right)$$

is the noise in a UE antenna element, as a fraction of the power in an RP antenna element. Then consider the eigen-decomposition $B+s^2I=V\Lambda V'$, where the columns of V are the eigenvectors, and diagonal matrix $\Lambda$ has the corresponding eigenvalues on its diagonal. Note that $$\Lambda_{i,i} = s^2 + \lambda^2_{B,i,i} \quad (12)$$

where $\lambda_{B,i,i}^2$ is the interference power that would arise from use of $p=v^{\{i\}}$, the ith column of V. Let $\rho=\zeta^{1/2}V'p$, and rewrite (11) as $$SINR = \frac{\rho' C \rho}{\rho' \rho} \quad (13)$$

where $C=\Lambda^{-1/2}V'AV\Lambda^{-1/2}$.

The value for SINR is maximized with $\rho$ equal the eigenvector of C corresponding to its maximum eigenvalue. In fact, the rank r precoder $\hat{W}$ whose columns consist of the r largest eigenvectors of C, normalized, provides the highest rate for the channel $H^{\{k,m\}}V\Lambda^{-1/2}$. The corresponding precoder for the actual channel $H^{\{k,m\}}$ is $$P^{\{k,m\}} = V\Lambda^{-1/2} \hat{W}. \quad (14)$$

Note that matrix $\Lambda^{-1/2}$ tends to distribute the power in the precoder across basis vectors in inverse proportion to $s^2+\lambda_{B,i,i}^2$. When $\lambda_{B,i,i}^2 >> s^2$, i.e., the interference power generated by column $v^{\{i\}}$ is less than the scaled noise level, $v^{\{i\}}$ is allowed full weighting in $P^{\{k,m\}}$. However, when $\lambda_{B,i,i}^2 >> s^2$, weighting is in inverse proportion to the interference power generated with $v^{\{i\}}$.

In the above development, the precoder for a given UE is designed to suppress the interference generated for all other UEs. In general, the interference generated by UE $k \in \theta_m$ is greater for other UEs in $\theta_m$ than for UEs in $\theta_1 \cup \theta_2 \setminus \theta_m$ (closer to the other RP). In Section 3 we compare the performance for same-RP-UE only (local) interference suppression with that for all-UE (global) interference suppression.

2.2 D-MU-MIMO with Data Transmission from Multiple RPs

For D-MU-MIMO, both RPs have knowledge of $H^{\{k,m\}}$, $\forall k,m$, and we adopt the more compact definition $$H^{\{k\}}[H^{\{k,1\}} H^{\{k,2\}}] \quad (15)$$

for the channel matrices, where the channel $H^{\{k\}}$ to UE k has dimension $N_r \times 2N_t$, reflecting the single effective (distributed) antenna array spanning both RPs. As both RPs in general transmit data $x^{\{k\}}$ to a UE k, we also drop "m" from the precoder notation $P^{\{k,m\}}$, and use the notation $P^{\{k\}}$ for the dimension $2N_t$Xr precoder matrix used with D-MU-MIMO. Equations (1) and (2) for RP transmission and UE reception have the following more compact forms for D-MU-MIMO:

$$y = \sqrt{\gamma_{tot}/N_t} \sum_k P^{\{k\}} x^{\{k\}} \quad (16)$$

and $$r^{\{k\}} = H^{\{k\}} y + n^{\{k\}}, \quad (17)$$

where y is the $2N_rX1$ vector joining the composite transmissions from the two RPs, and the UE reception (3) can be rewritten $$r^{\{k\}} = \sqrt{\gamma_{tot}/N_t}\; H^{\{k\}} P^{\{k\}} x^{\{k\}} + n^{\{k\}} + \sqrt{\gamma_{tot}/N_t}\; H^{\{k\}} \sum_{j \in \theta_1 \cup \theta_2 \backslash k} P^{\{j\}} x^{\{j\}}. \quad (18)$$

Repeating the development of (4)-(14), but for D-MU-MIMO, we arrive at $$P^{\{k\}} = V\Lambda^{-1/2}\tilde{W} \quad (19)$$

for the precoder scheme with interference suppression, where the terms on the RHS are based on the D-MU-MIMO channels $H^{\{k\}}$ and $$A = H^{\{k\}\prime} H^{\{k\}}, \quad (20)$$

and $$B = \sum_{j \in \theta_1 \cup \theta_2 \backslash k} H^{\{j\}\prime} H^{\{j\}}. \quad (21)$$

2.3 Scaling for the Precoders

As mentioned previously, the precoders are nominally scaled for unity average-square value per antenna array element, averaged across elements. Let $\pi_i^{\{k\}}$ represent the average square value for element i of the array for UE k's transmission (prior to scaling of $P^{\{k,m\}}$ or $P^{\{k\}}$), and note that $$\pi_i^{\{k\}} = \begin{cases} \sum_{n=1}^r \|P^{\{k,m\}}\|_{i,n}^2 = [P^{\{k,m\}} P^{\{k,m\}\prime}]_{i,i}, & MU-MIMO, \\ \sum_{n=1}^r \|P^{\{k\}}\|_{i,n}^2 = [P^{\{k\}} P^{\{k\}\prime}]_{i,i}, & D-MU-MIMO, \end{cases} \quad (22)$$

where as before r represents the rank used by UE k for SM.

We restrict our attention to scaling whereby each UE $k \in \theta_m$ is allotted the same power in RP m, i.e., transmissions to UEs with the same "home RP" have the same power at that RP. (Performance gains may be had with unequal allocation of power among UEs, e.g., a greater share to UEs more distant from the RPs.) For D-MIMO, the scale-factor $s_k$ for UE $k \in \theta_m$ is chosen so that $$s_k^2 \sum_i \pi_i^{\{k\}} / N_t = 1/|\theta_m| \quad (23)$$

is satisfied, where $|\theta_m|$ is the number of UEs in reuse having home-RP m. Notice from (22)-(23) that the power per SM stream is relatively small for relatively large SM rank r, as well as for a relatively large number of UEs in reuse.

In most implementations we must cap the power in an antenna element, and this results in stricter scaling than (23) alone. The scaling $s_{cap}$ for power capping is a single scaling applied on top of (23) for all UEs $k \in \theta_m$. After computing (23), the scaled $s_k P^{\{k,m\}}$ are substituted back in (22) and for D-MIMO the power-cap scaling satisfies $$s_{cap}^2 \max_i \left( \sum_k \pi_i^{\{k\}} \right) = 1. \quad (24)$$

For D-MU-MIMO the home-RP component of the composite channel (15) for a given UE can have significantly greater magnitude than the other-RP component, and this can result in a similar imbalance for the magnitudes of the corresponding components of $P^{\{k\}}$. Consequently, the scaling of the $P^{\{k\}}$ for D-MU-MIMO is performed in two steps. First, scaling according to (23) is performed separately for UEs in the two sets $\theta_1$ and $\theta_2$, using only the array elements corresponding to the two sets. That is, the scaling $s_k$ for UE $k \in \theta_m$ satisfies $$s_k^2 \sum_{i \in \omega_m} \pi_i^{\{k\}} / N_t = 1/|\theta_m|, \quad (25)$$

where $\omega_m$ is the set of array elements at RP m. For the $2^{nd}$ step, the scaled $s_k P^{\{k\}}$ are substituted back in (22), and a second scaling satisfying $$\tilde{s}^2 \max_m \left( \sum_{i \in \omega_m} \sum_k \pi_i^{\{k\}} / N_t \right) = 1 \quad (26)$$

is calculated and applied to account for the contributions to an RP's power, from transmissions for other-RP UEs. The (single) second scalings is applied for the $P^{\{k\}}$ of all UEs. Note that it is not possible to scale for the two RPs separately, as this would invalidate the joint optimization performed for the two components of $P^{\{k\}}$. To implement power-capping for the array elements in D-MU-MIMO, the scaling of the second step (26) instead satisfies $$\tilde{s}_{cap}^2 \max_{i \in \omega_1 \cup \omega_2} \left( \sum_k \pi_i^{\{k\}} \right) = 1 \quad (27)$$

3. Simulation Results

A simulation using a Win-II channel model was conducted to compare the performances of the precoding schemes described in Section 2. The Large-indoor-hall channel model with non-line-of-sight propagation was used, with distance 100 m between RPs, as shown in FIG. 3. Total transmit power for an RP is $\gamma_{tot}$=23 dBm, assumed distributed over bandwidth 100×180 kHz, the UE noise figure is 8 dB, and the carrier frequency is 3.5 GHz. The UEs and both RPs use linear, half-wavelength spaced antenna arrays. A UE uses $N_r$=4 elements, in 2 V/H pairs, and an RP uses $N_t$=32 elements, in 16 V/H polarization pairs.

The precoding approach of Section 2 with interference suppression, but with consideration of only same-RP UEs for interference suppression is referred to as SVD with Local Interference Suppression (SVD-LIS). The approach with consideration of all UEs is referred to as SVD with Global Interference Suppression (SVD-GIS). The performances for SVD-GIS and SVD-LIS are compared to that for direct SVD precoding making no attempt at interference suppression.

Figure 4:
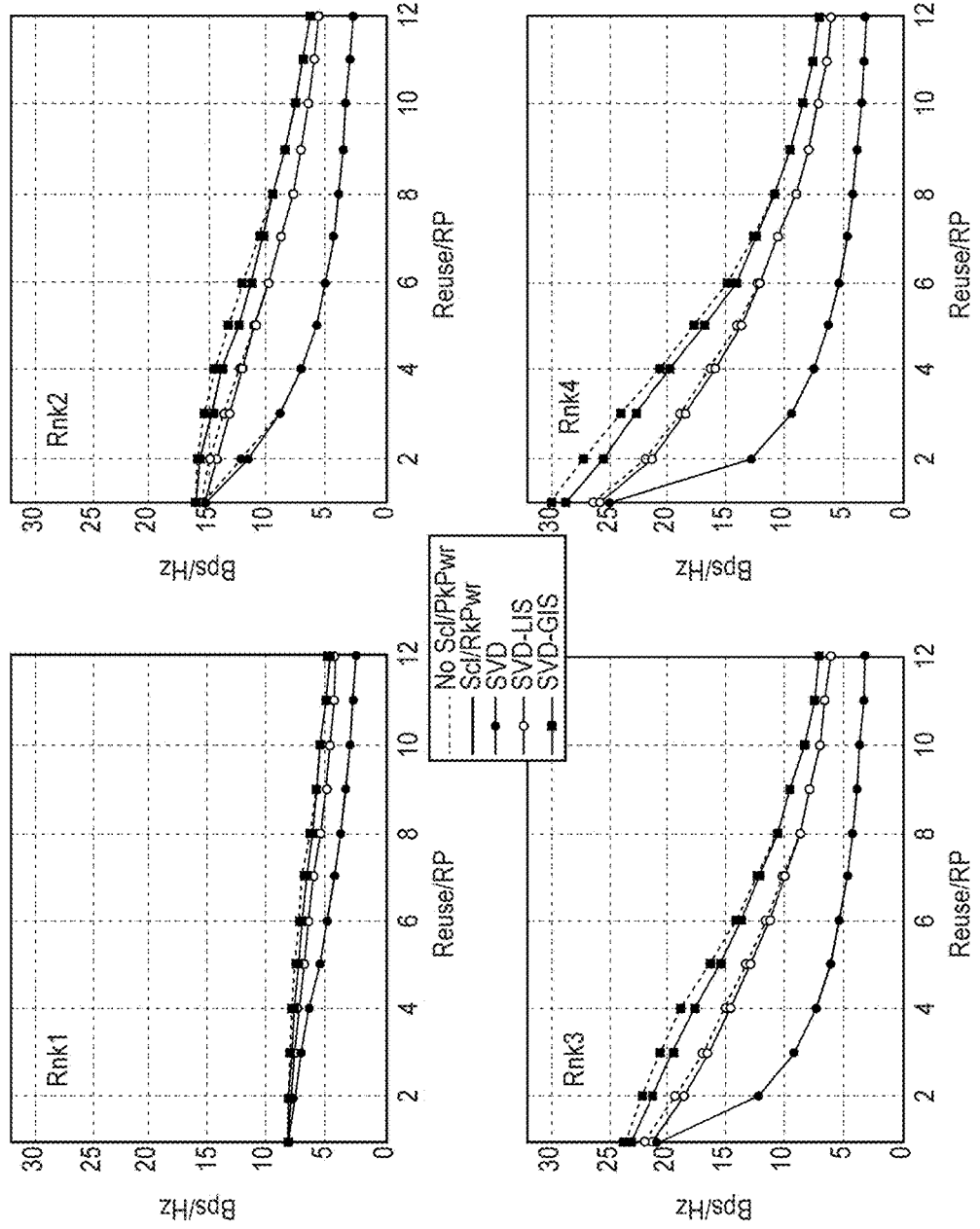
FIGS. 4 and 5 illustrate the average rate per UE vs Reuse factor per RP and the average sum-rate across all UEs vs Reuse factor per RP, respectively, for MU-MIMO transmission from a single radio point.
Figure 5:
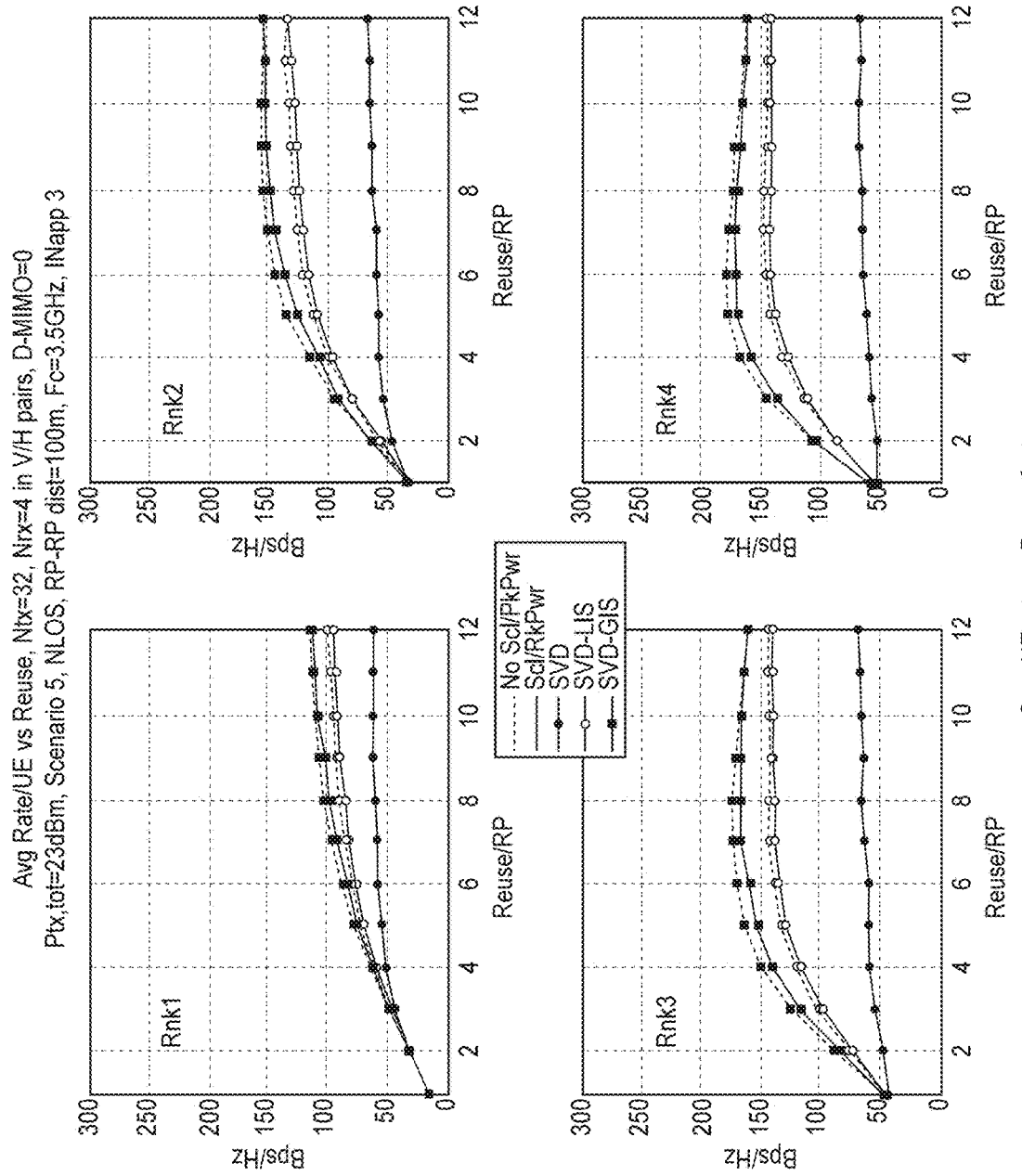

FIGS. 4 and 5 show the average rate per UE, and the average sum-rate across all UEs, both vs Reuse factor (number of UEs scheduled) per RP, for MU-MIMO (single RP) transmission. Spatial multiplexing with ranks 1-4 is considered. For these results a UE k uses a de-biased MMSE receiver, based on knowledge of the channel $H^{\{k,m\}}$ and the covariance matrix for the interference. The resulting SINR is converted to rate as rate $=\log 2(1+\text{SINR})$ bps/Hz, with a cap of 8 bps/Hz per SM stream.

Figure 6:
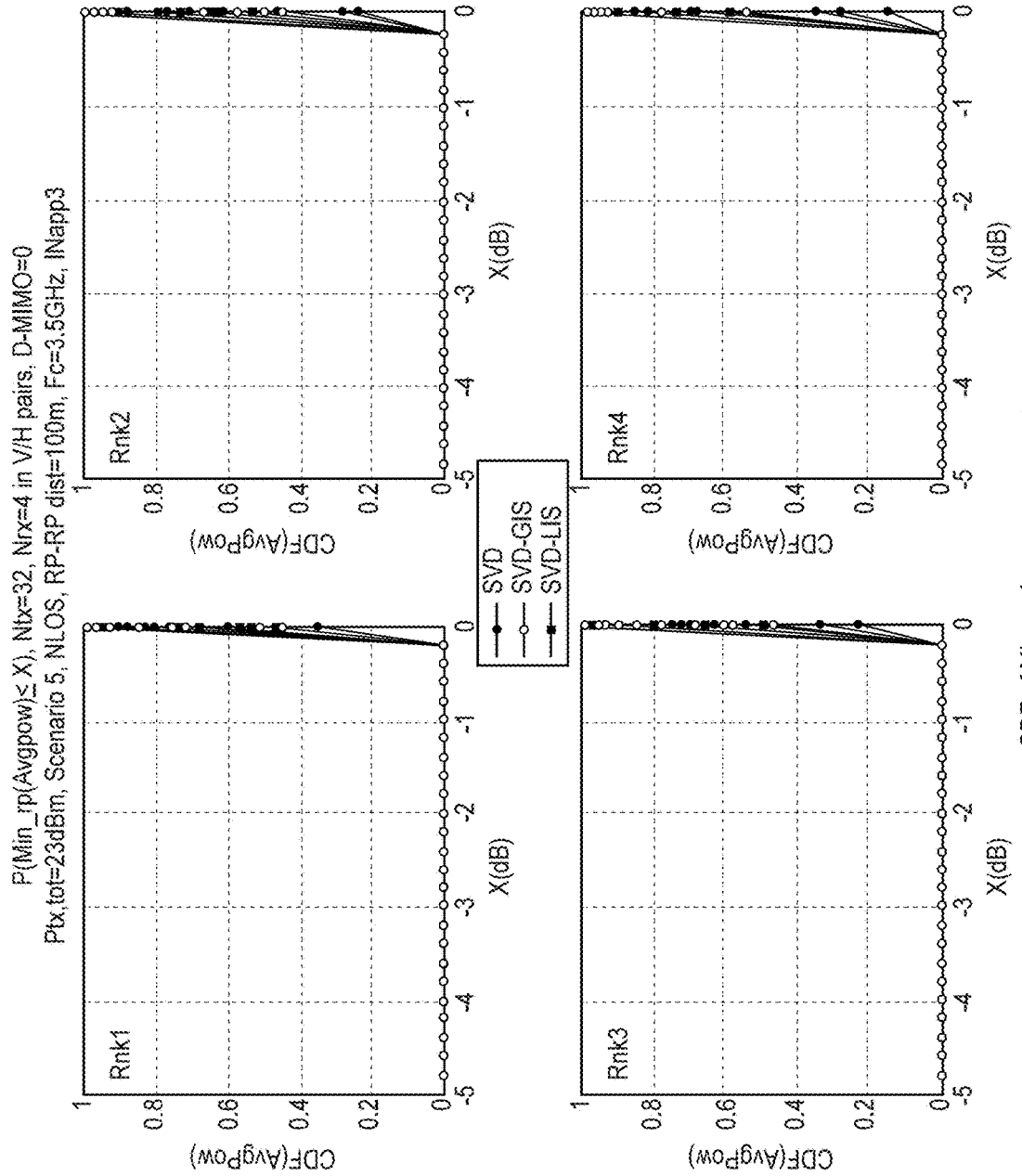
FIGS. 6 and 7 illustrate cumulative distribution functions (CDFs) of the minimum radio point average array power and the maximum radio point antenna element power associated with the scaling required for peak power capping for MU-MIMO transmission from a single radio point.
Figure 7:
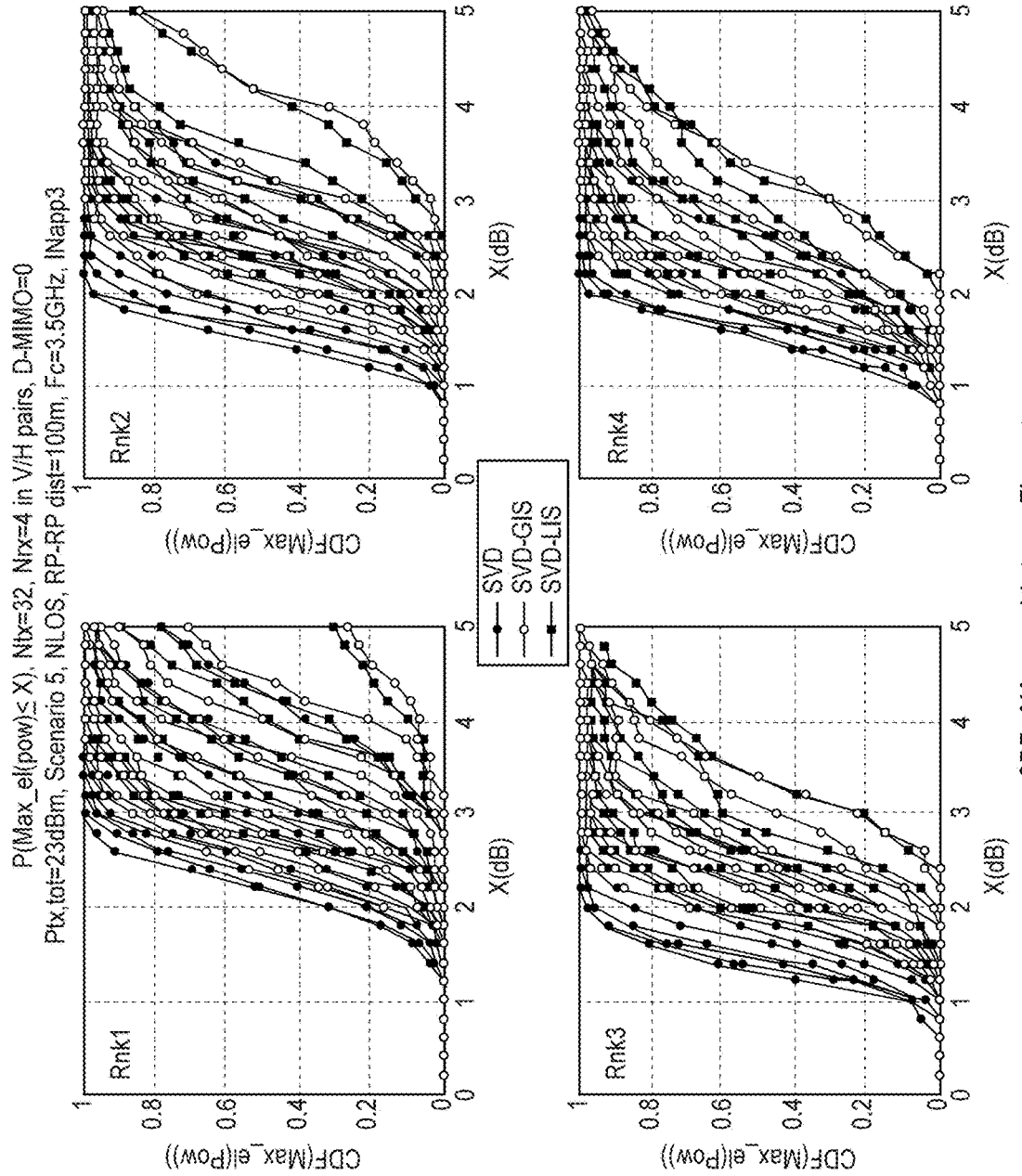
Figure 8:
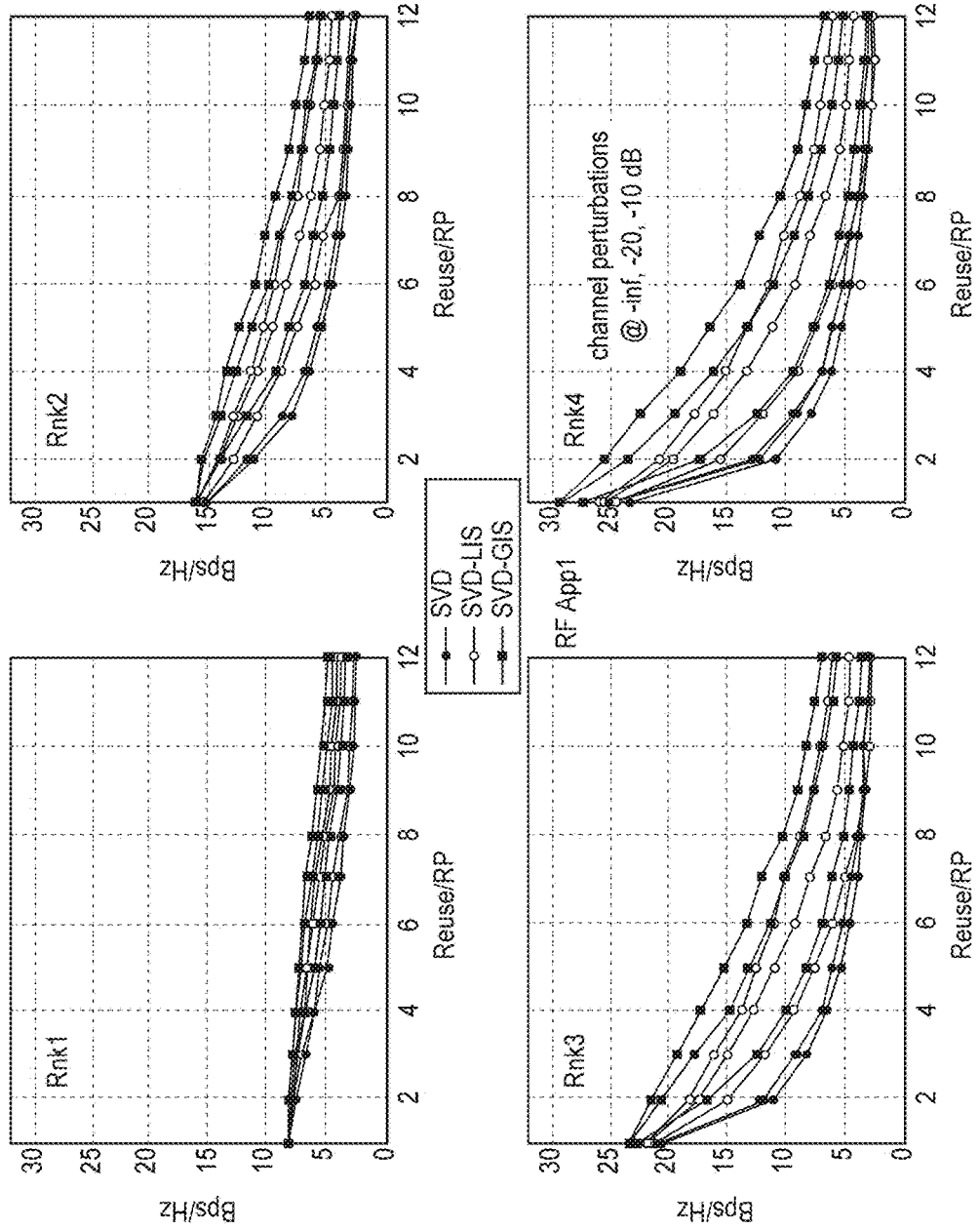
FIGS. 8 and 9 illustrate the impact on performance when there are errors (perturbations) in the RPs' estimates of the channels $H^{\{k,m\}}$ for MU-MIMO transmission from a single radio point.
Figure 9:
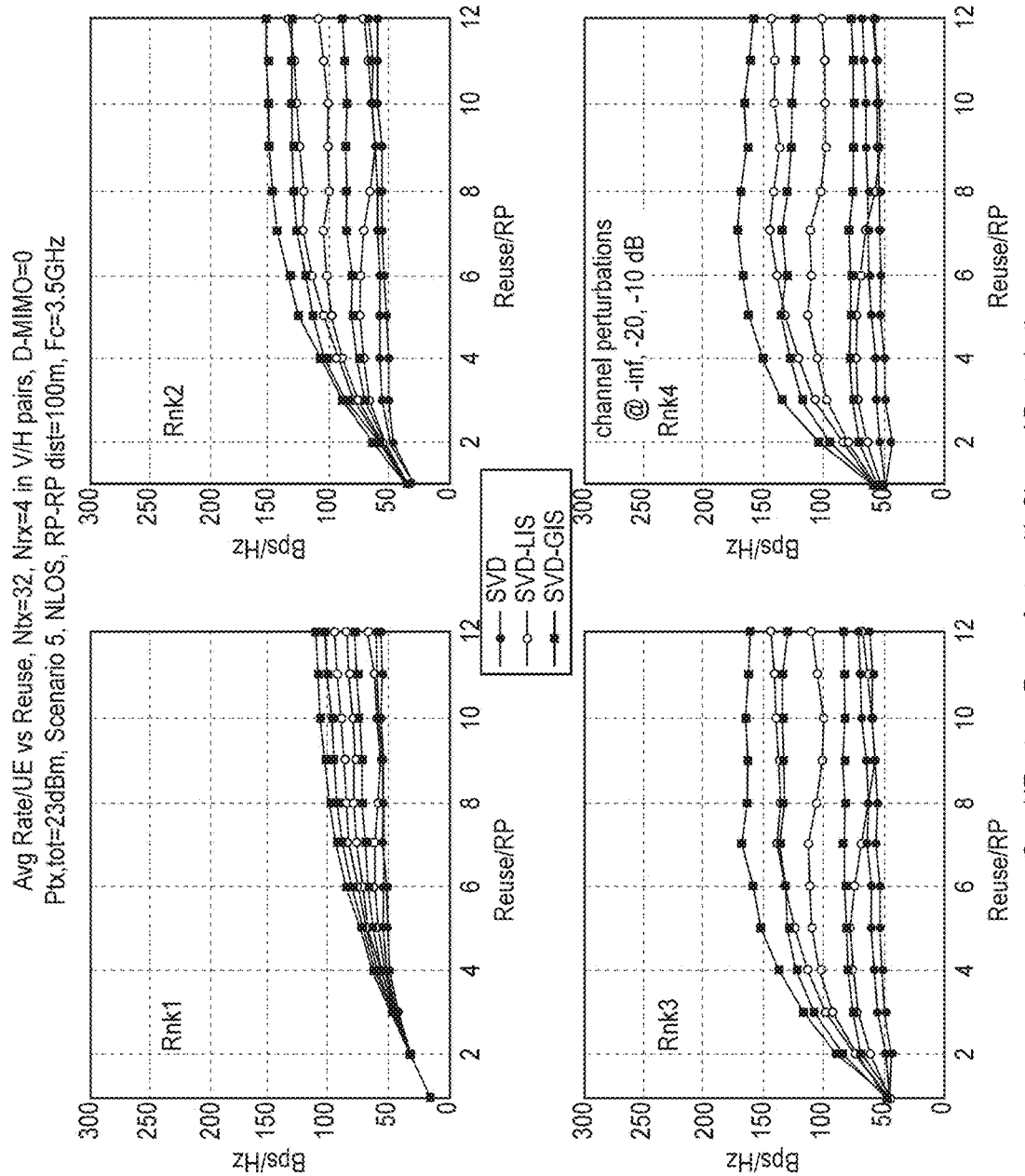
Figure 10:
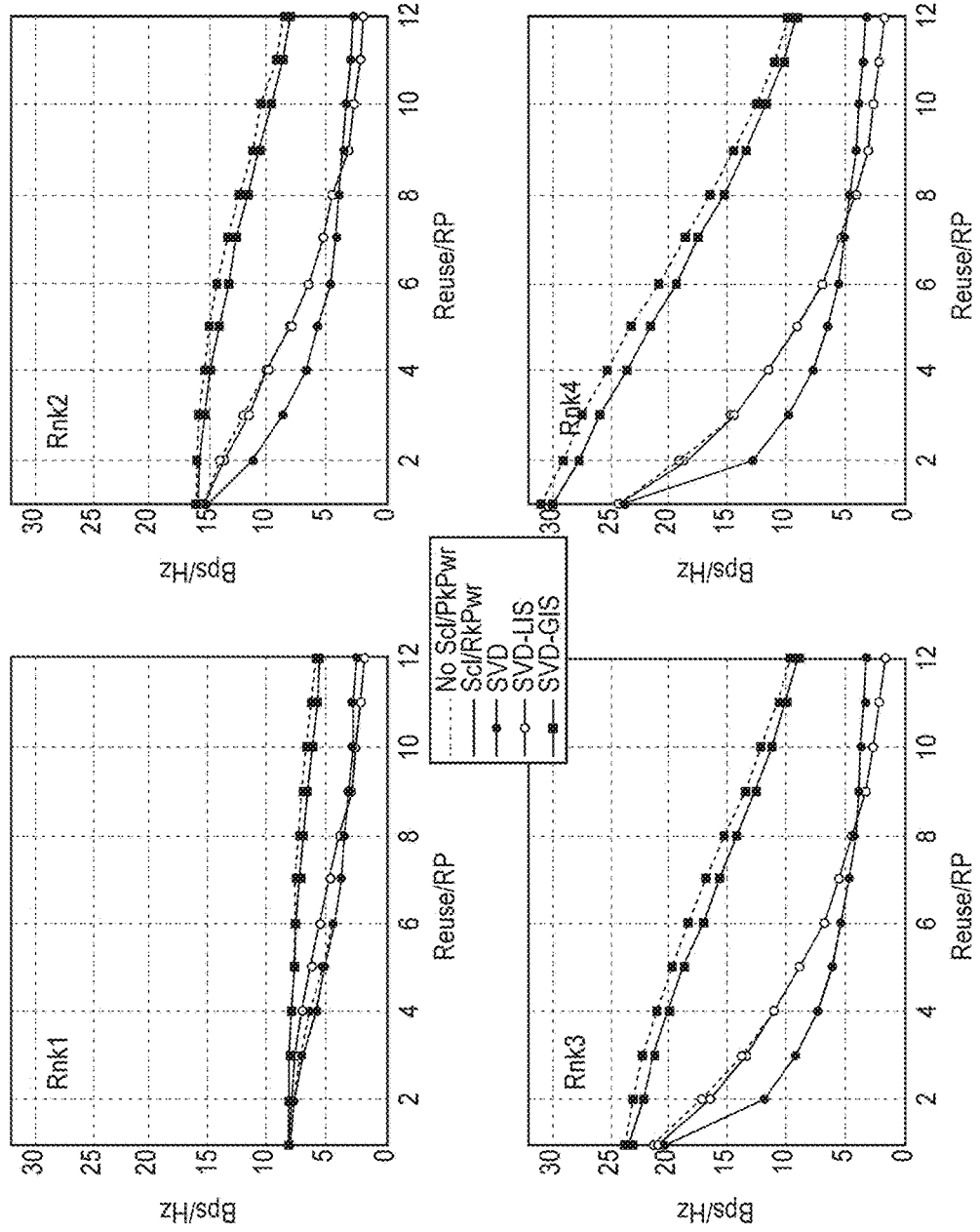
FIGS. 10 and 11 illustrate the average rate per UE vs Reuse factor per RP and the average sum-rate across all UEs vs Reuse factor per RP, respectively, for D-MU-MIMO.
Figure 11:
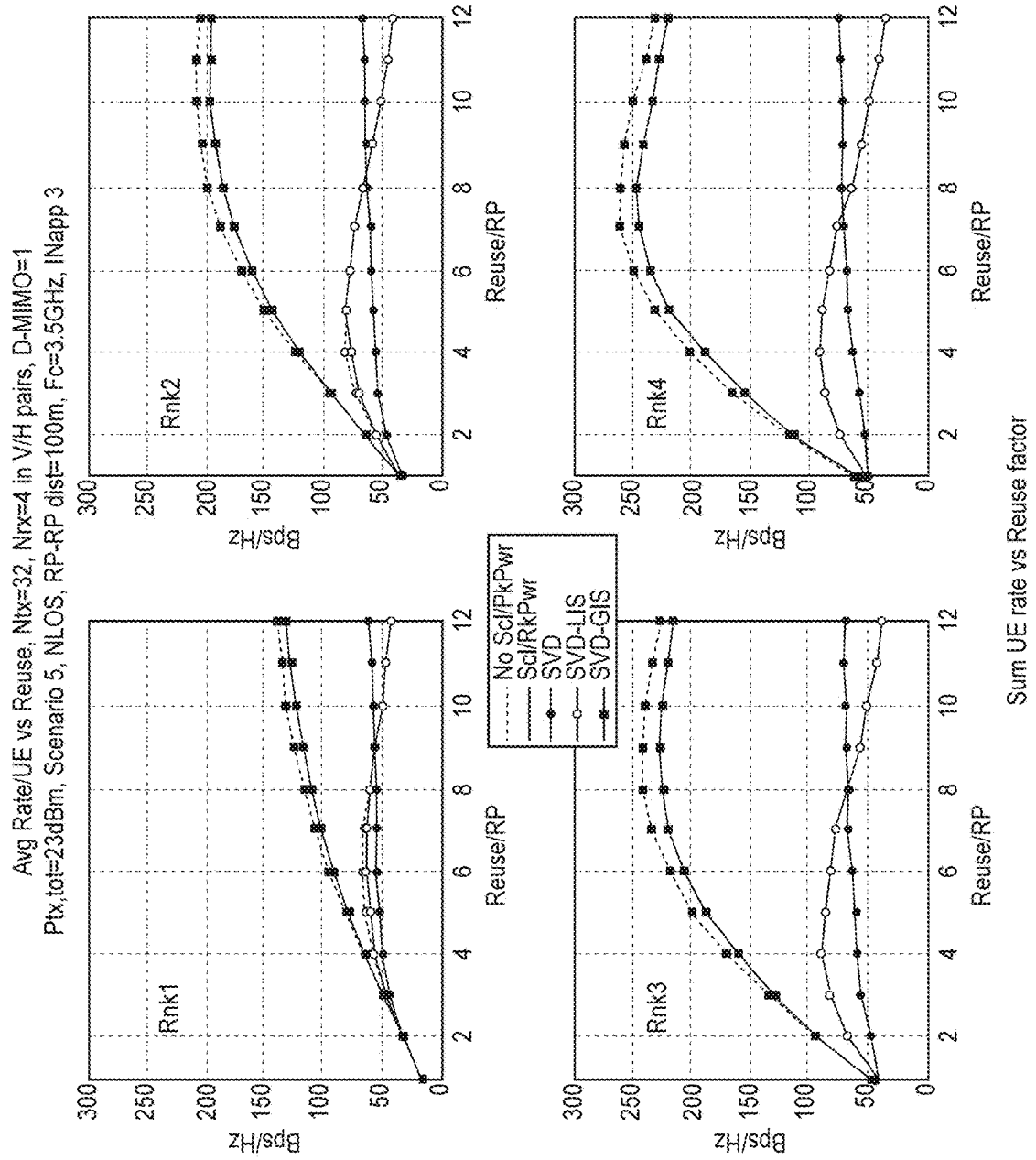
Figure 12:
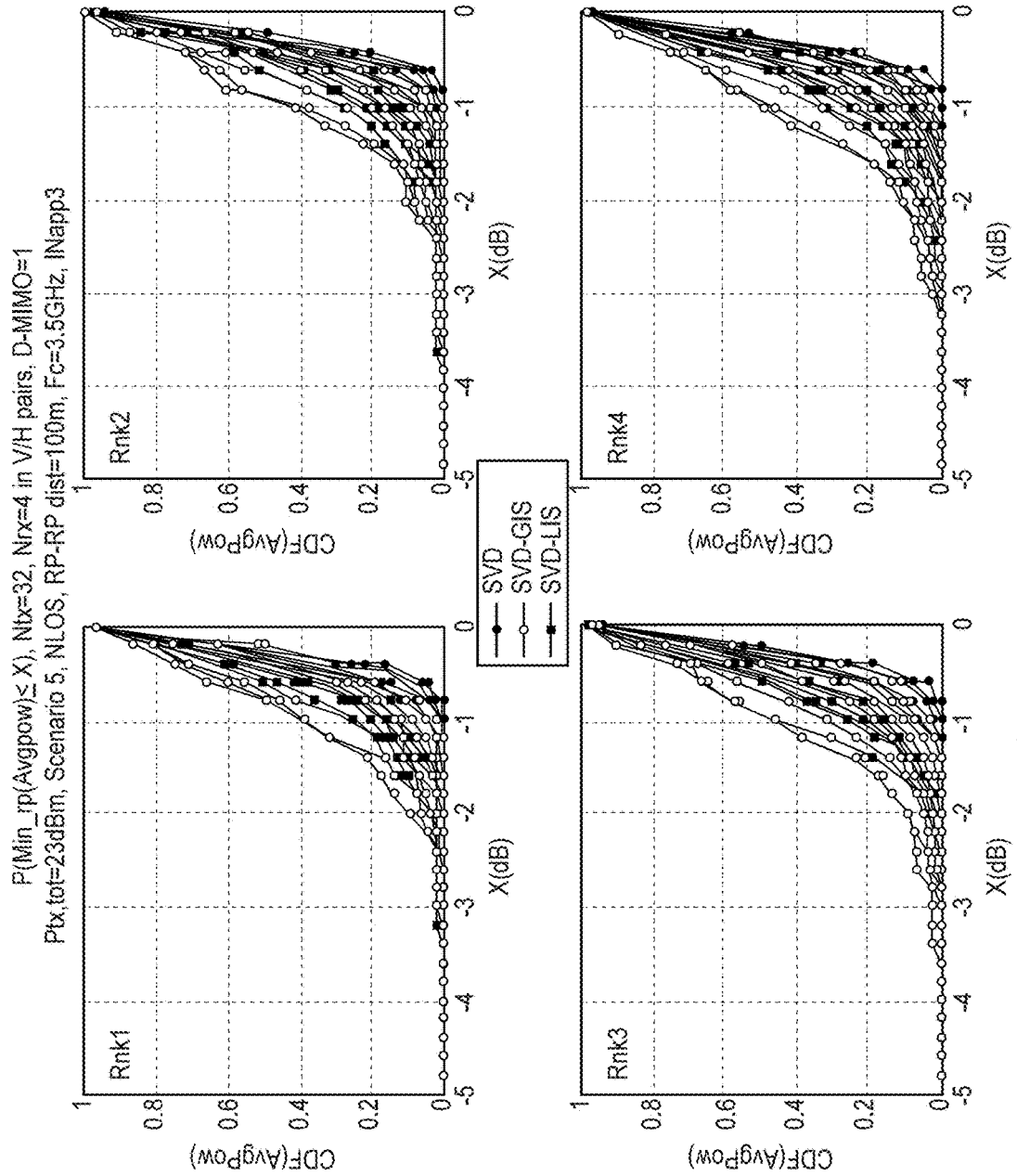
FIGS. 12 and 13 illustrate CDFs of the minimum radio point average array power and the maximum radio point antenna element power associated with the scaling required for peak power capping for D-MU-MIMO.
Figure 13:
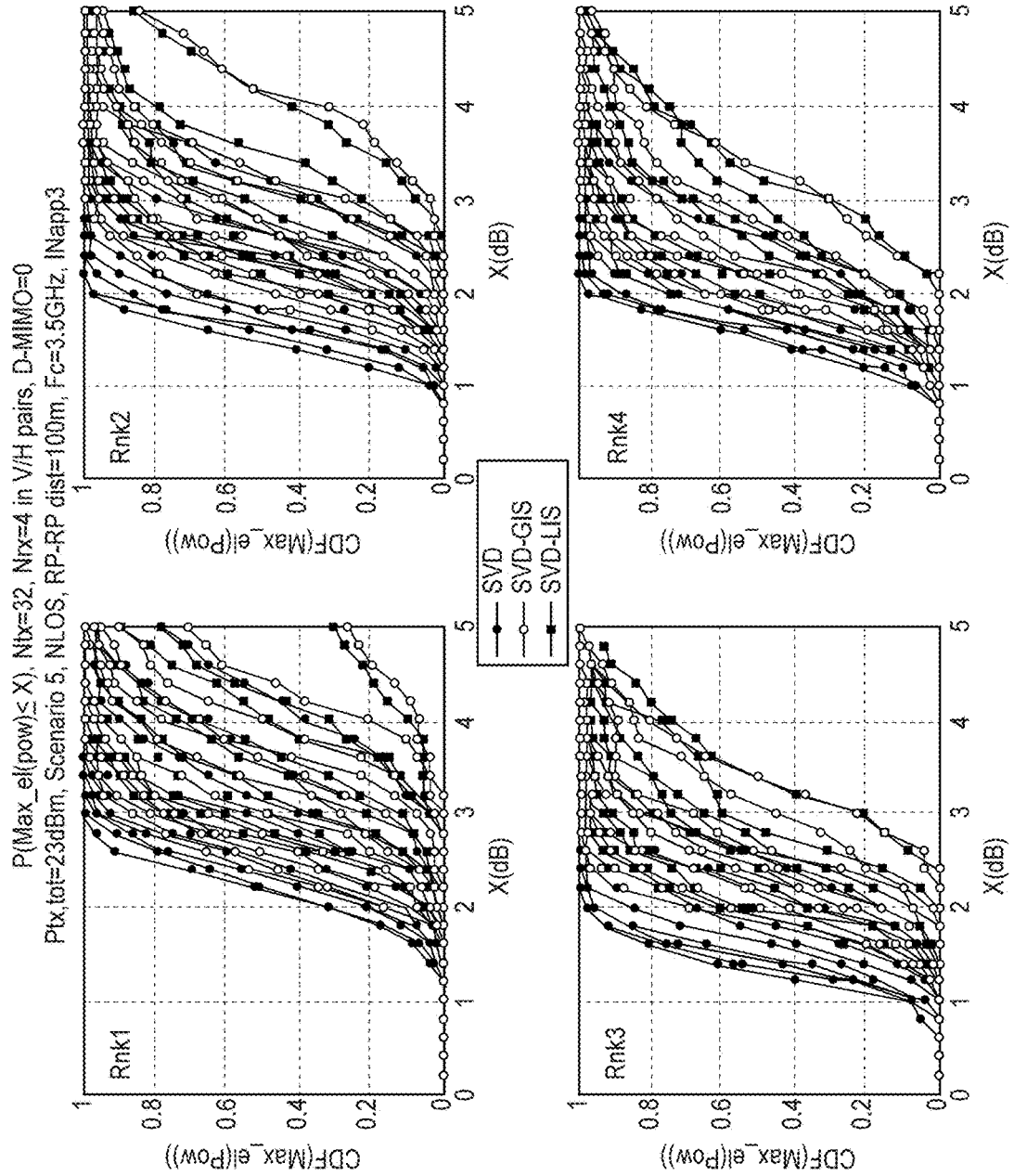
Figure 14:
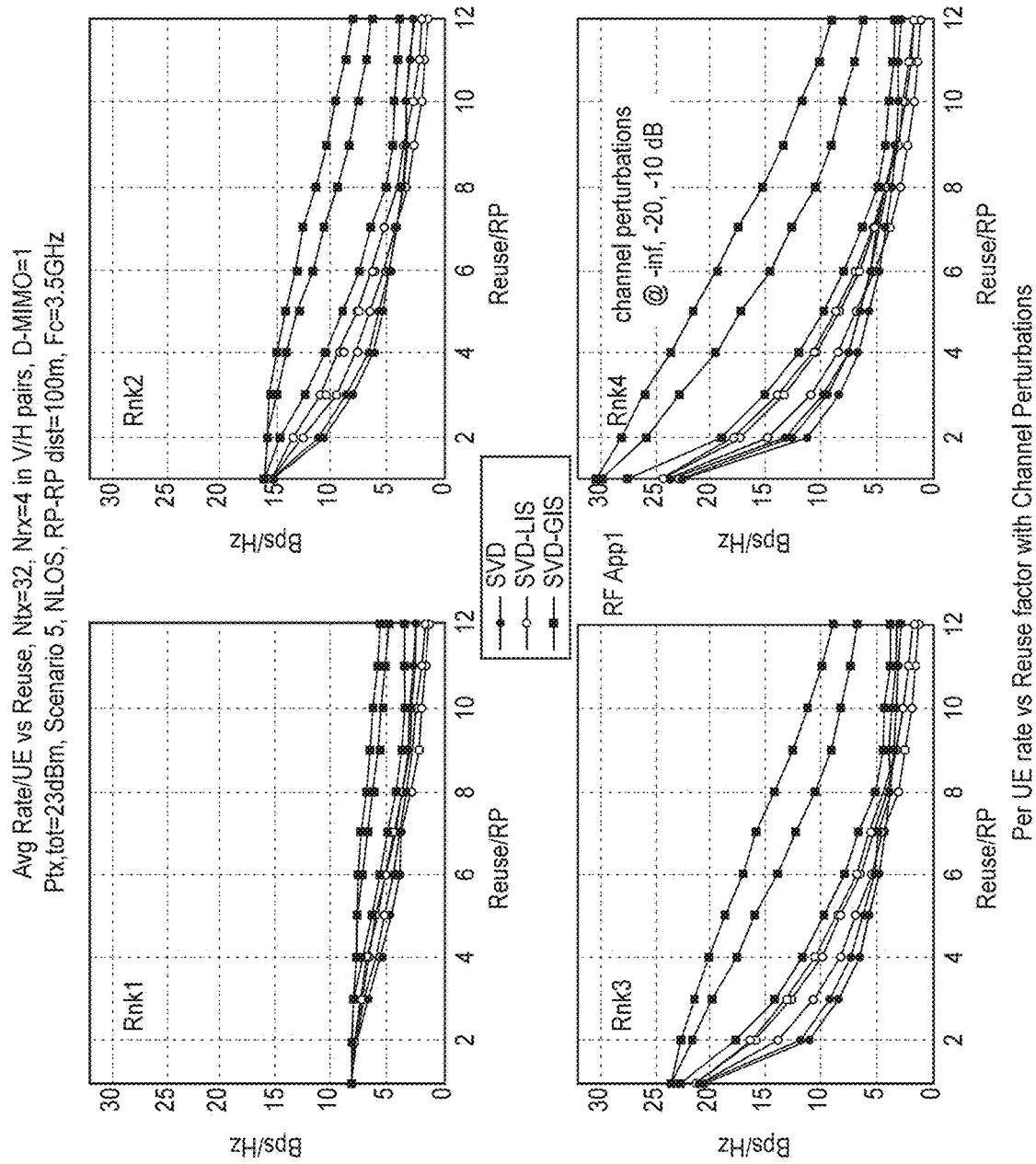
FIGS. 14 and 15 illustrate the impact on performance when there are errors (perturbations) in the RPs' estimates of the channels $H^{\{k,m\}}$ for D-MU-MIMO.
Figure 15:
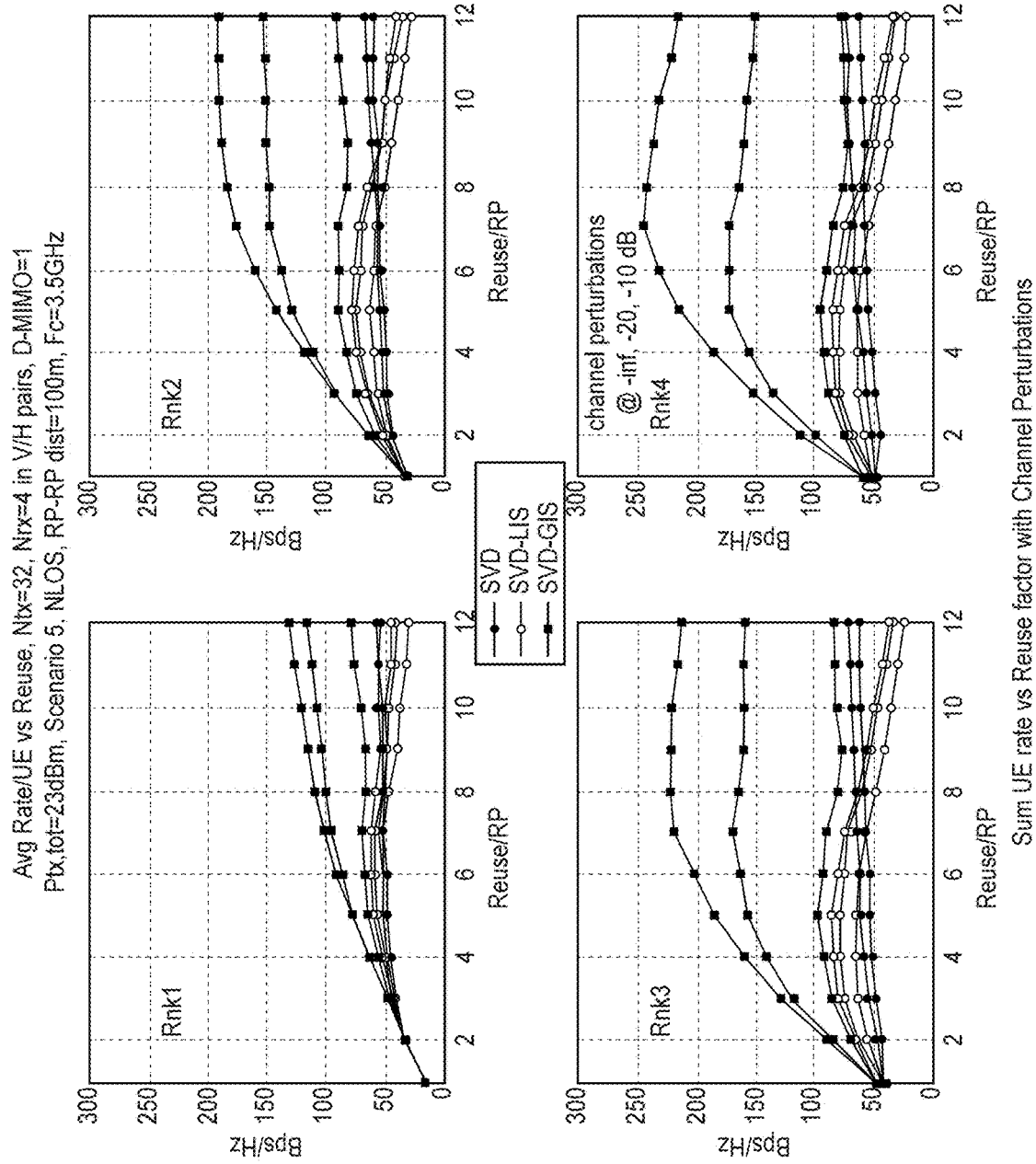
Figure 16:
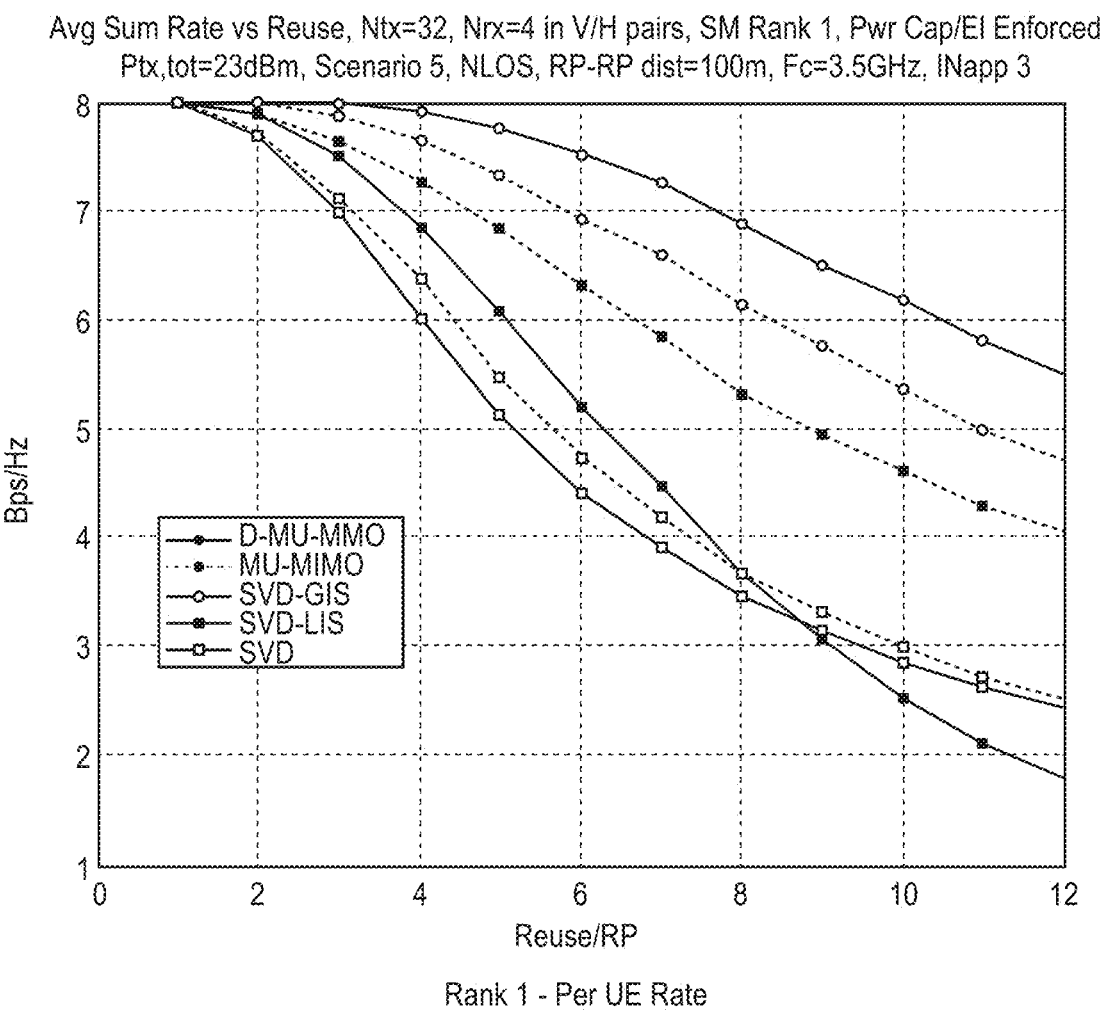
FIGS. 16-23 illustrate comparisons of the performances of D-MU-MIMO and MU-MIMO, for each of Singular Value Decomposition (SVD) precoding with Global Interference Suppression (SVD-GIS), SVD precoding with Local Interference Suppression (SVD-LIS), and direct SVD precoding.
Figure 17:
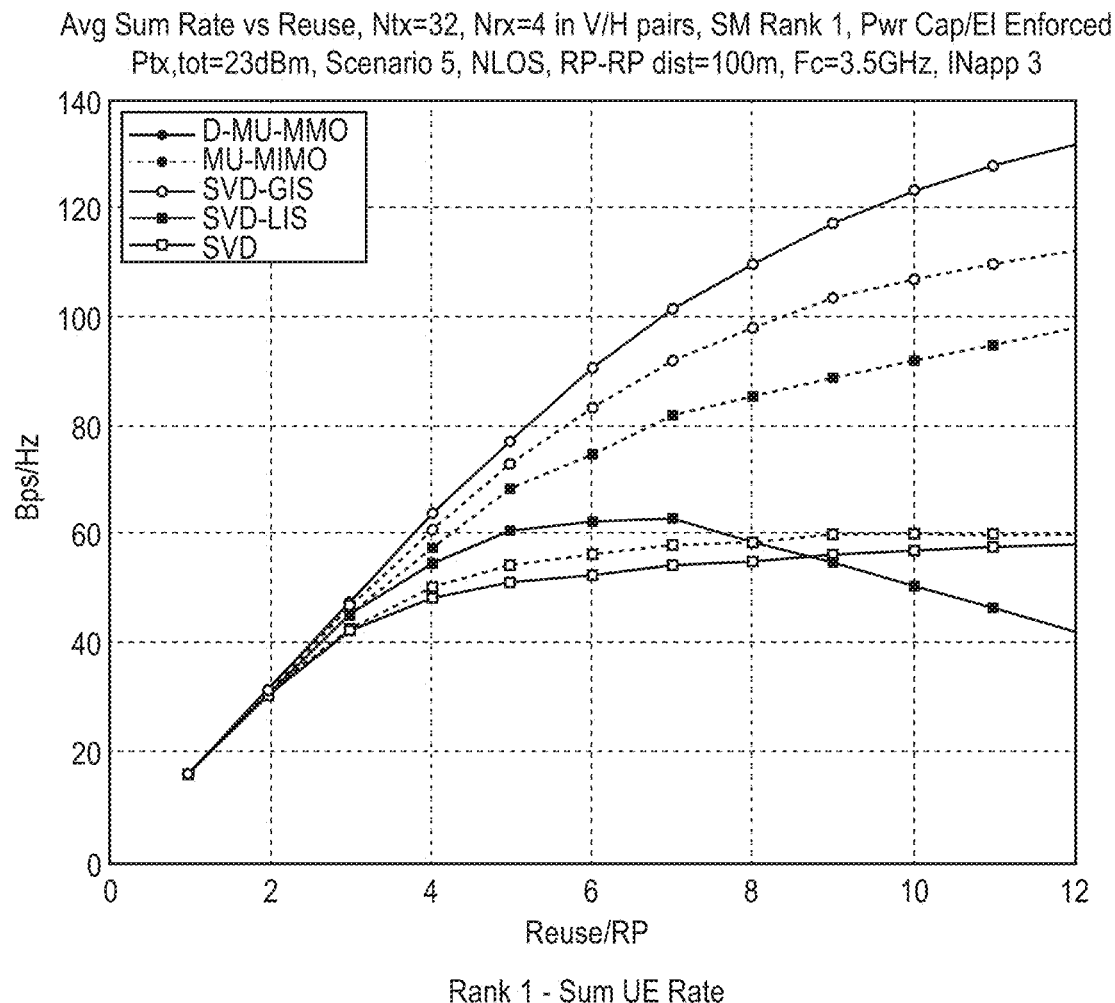
Figure 18:
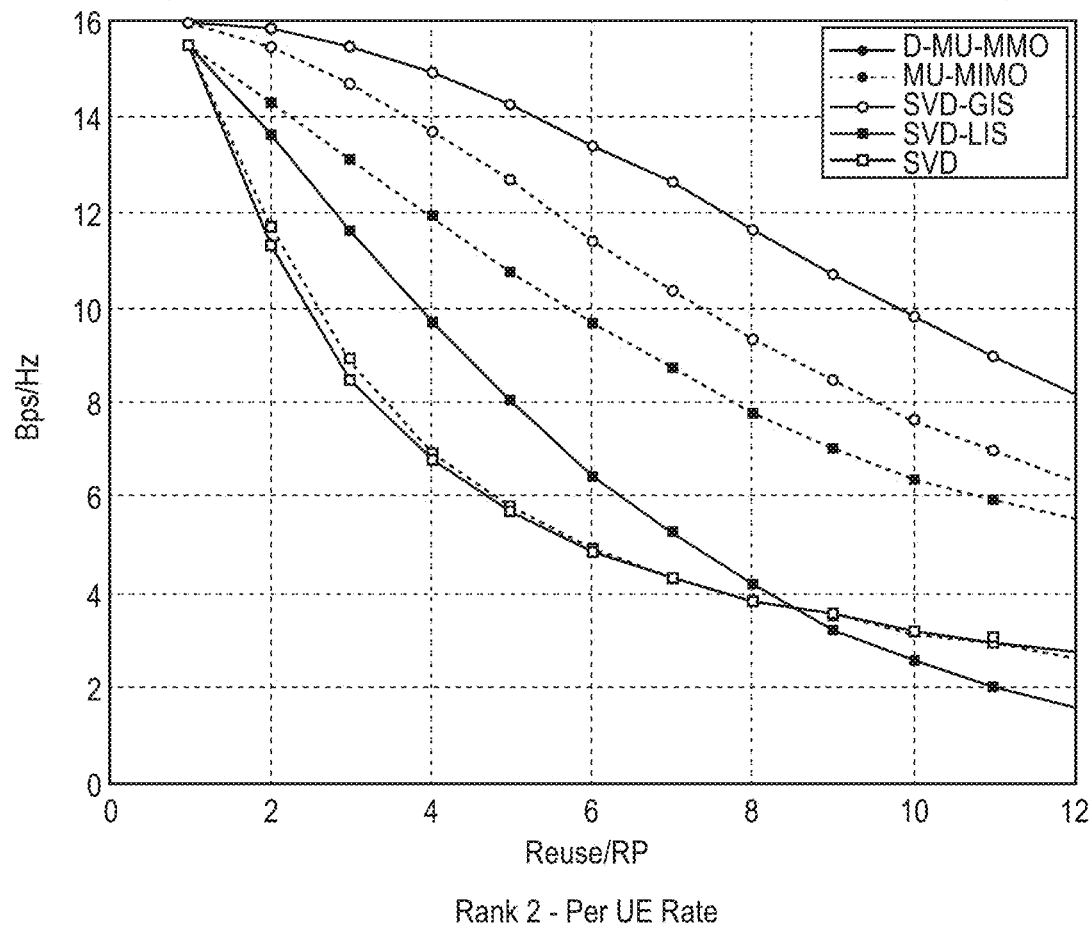
Figure 19:
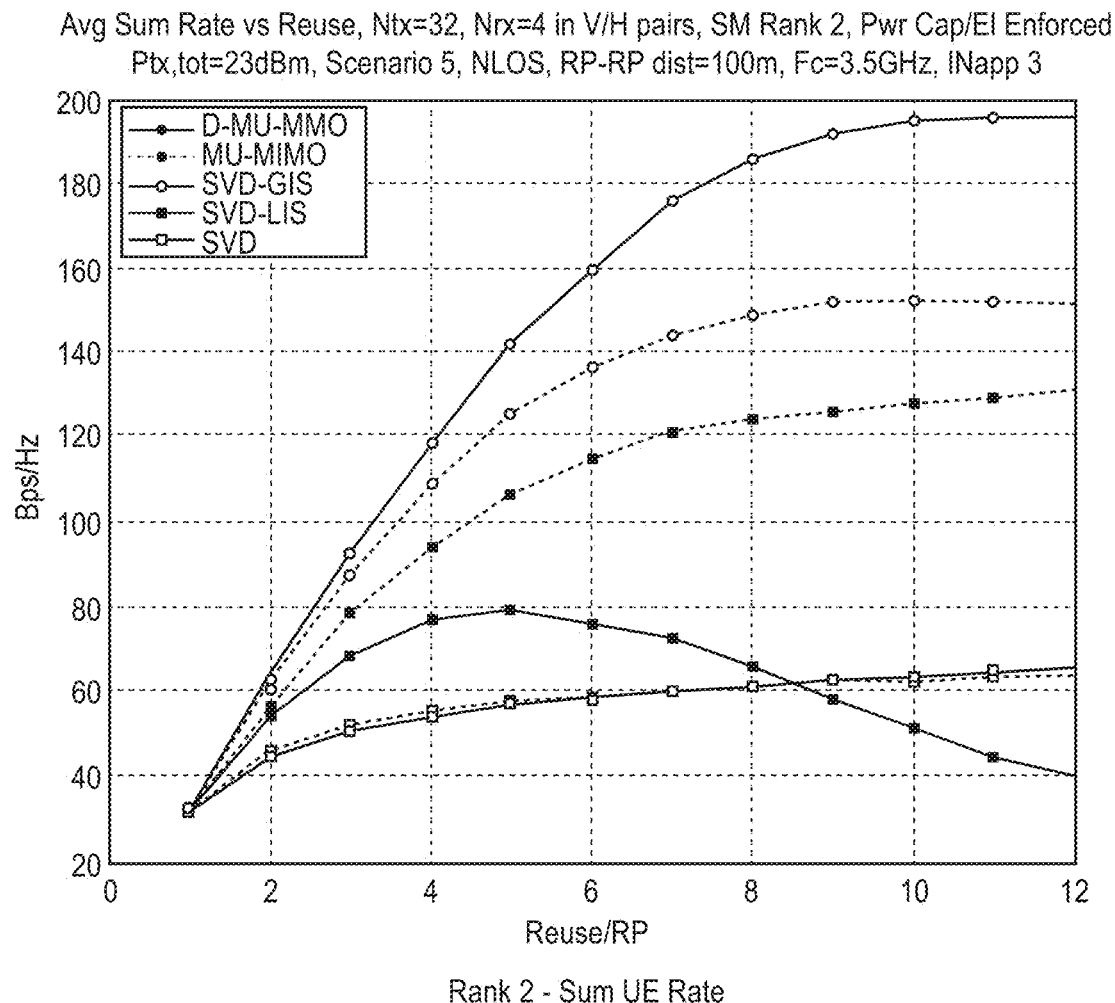
Figure 20:
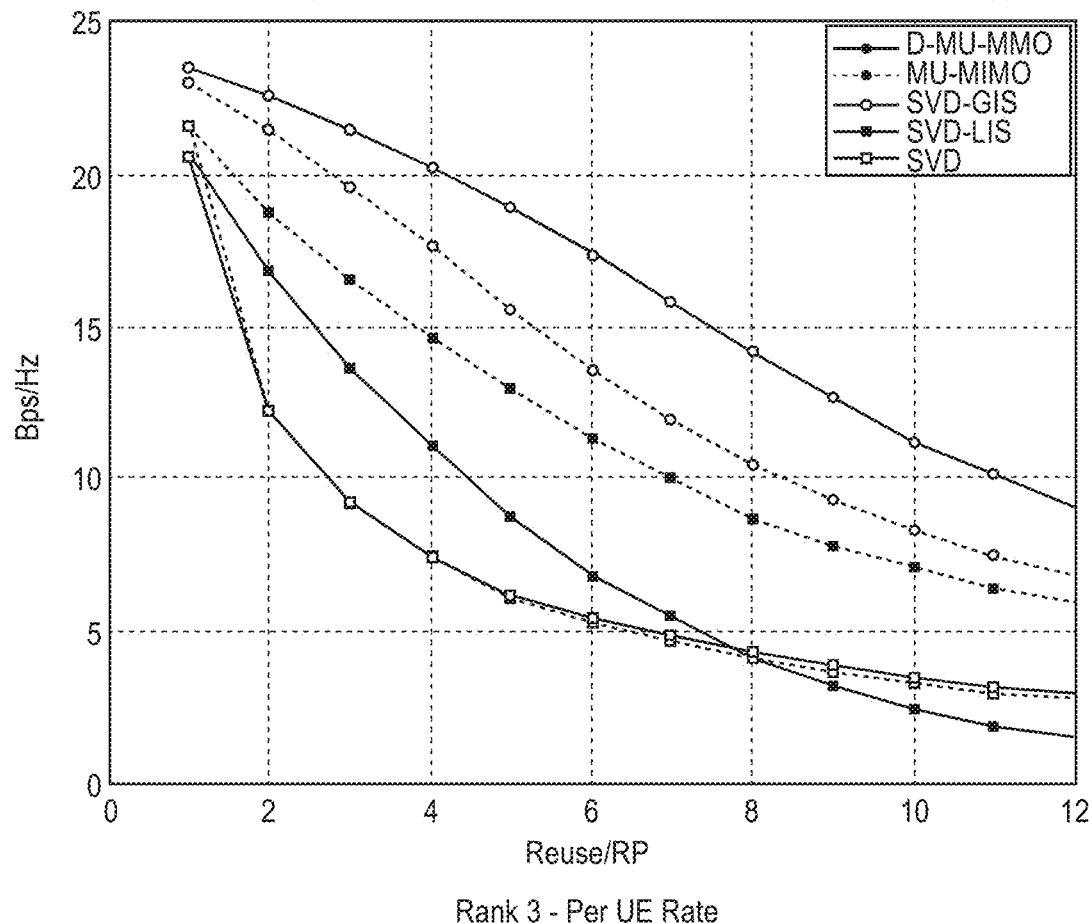
Figure 21:
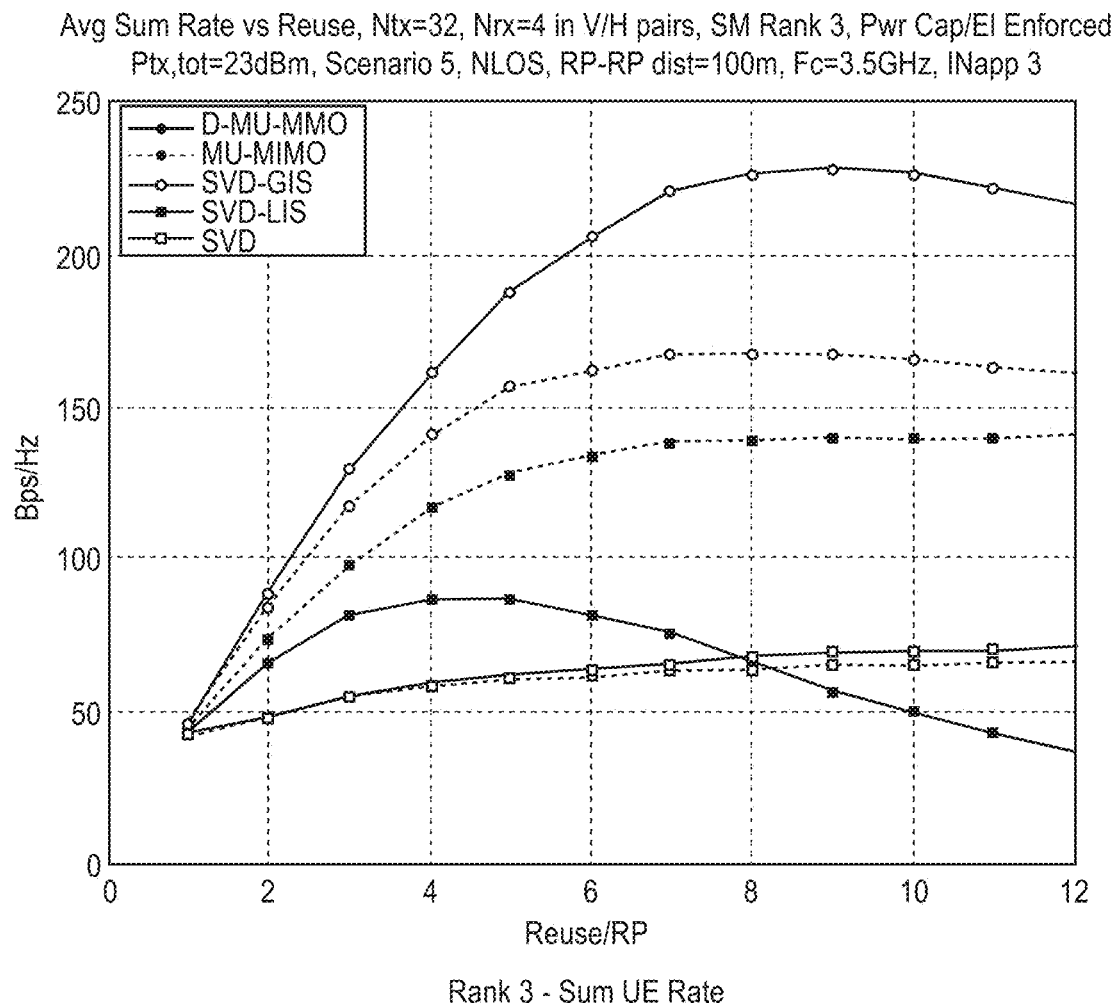
Figure 22:
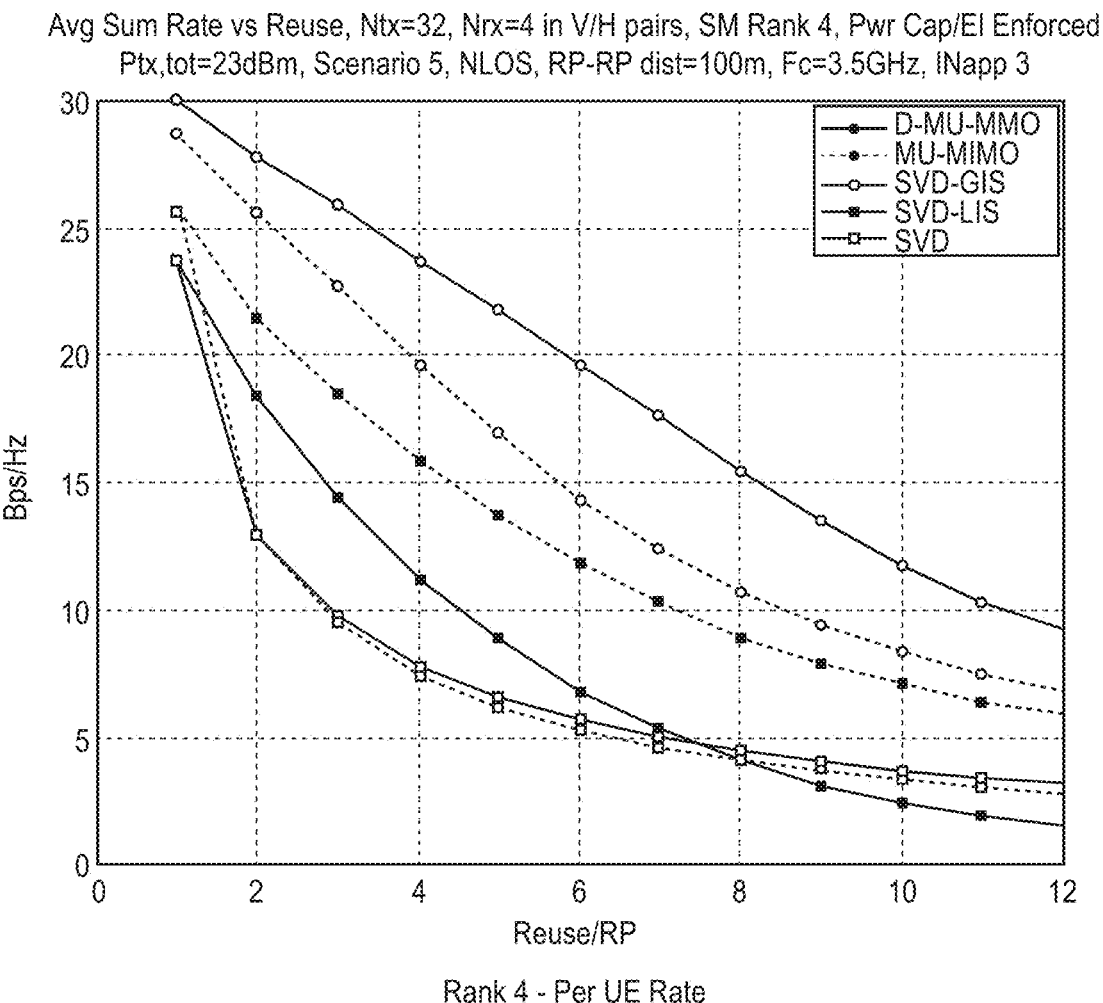
Figure 23:
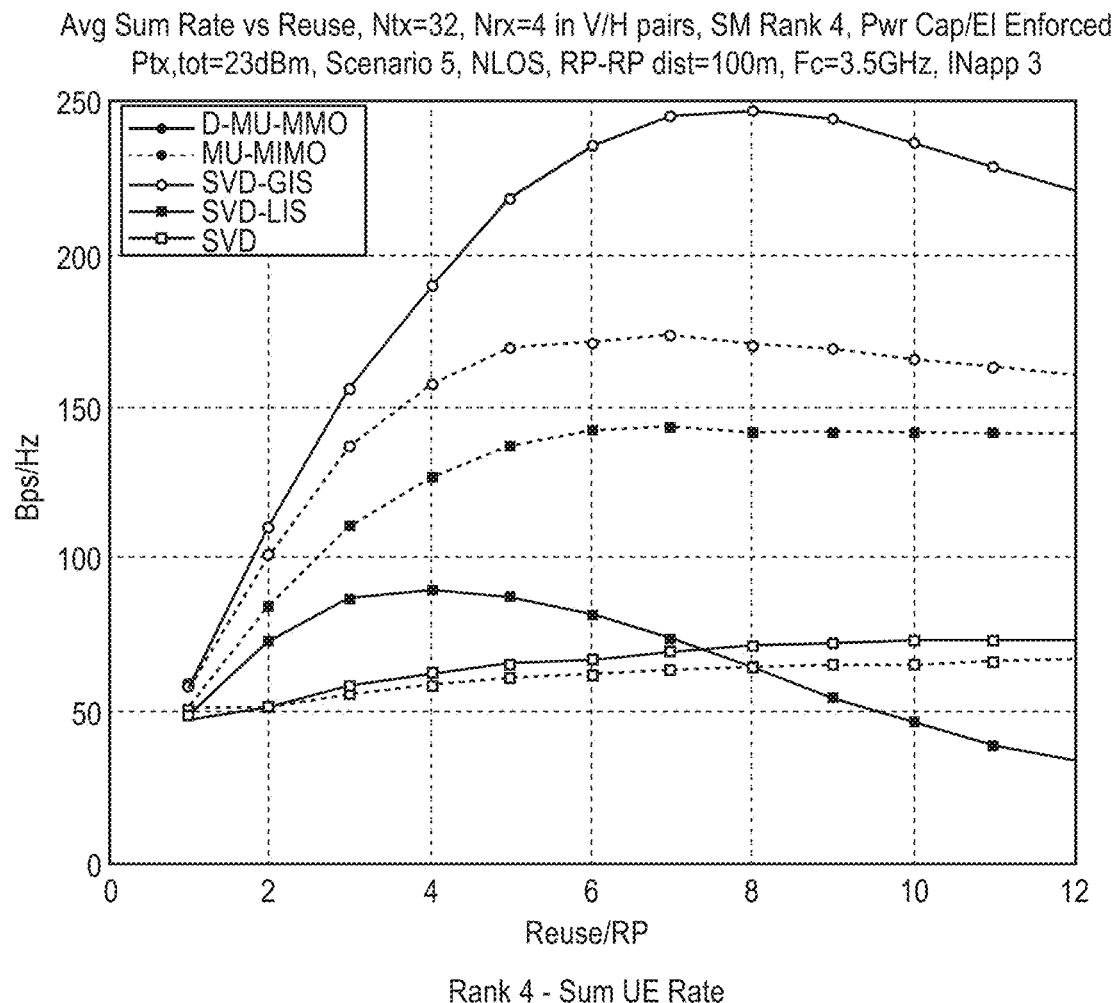
Figure 24:
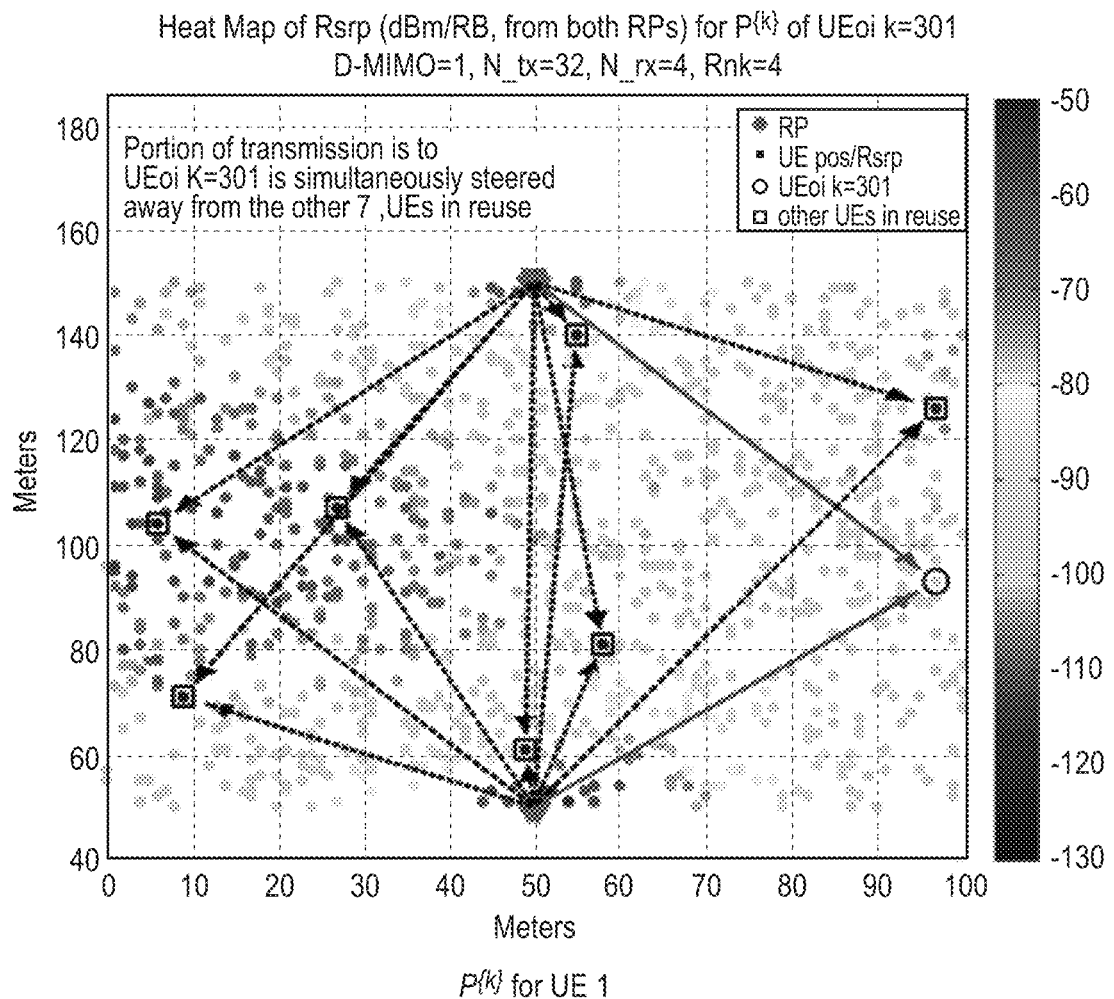
FIGS. 24-31 illustrate the reference signal receive power (Rsrp) heat maps for D-MU-MIMO with SVD-GIS, with no channel perturbations.
Figure 25:
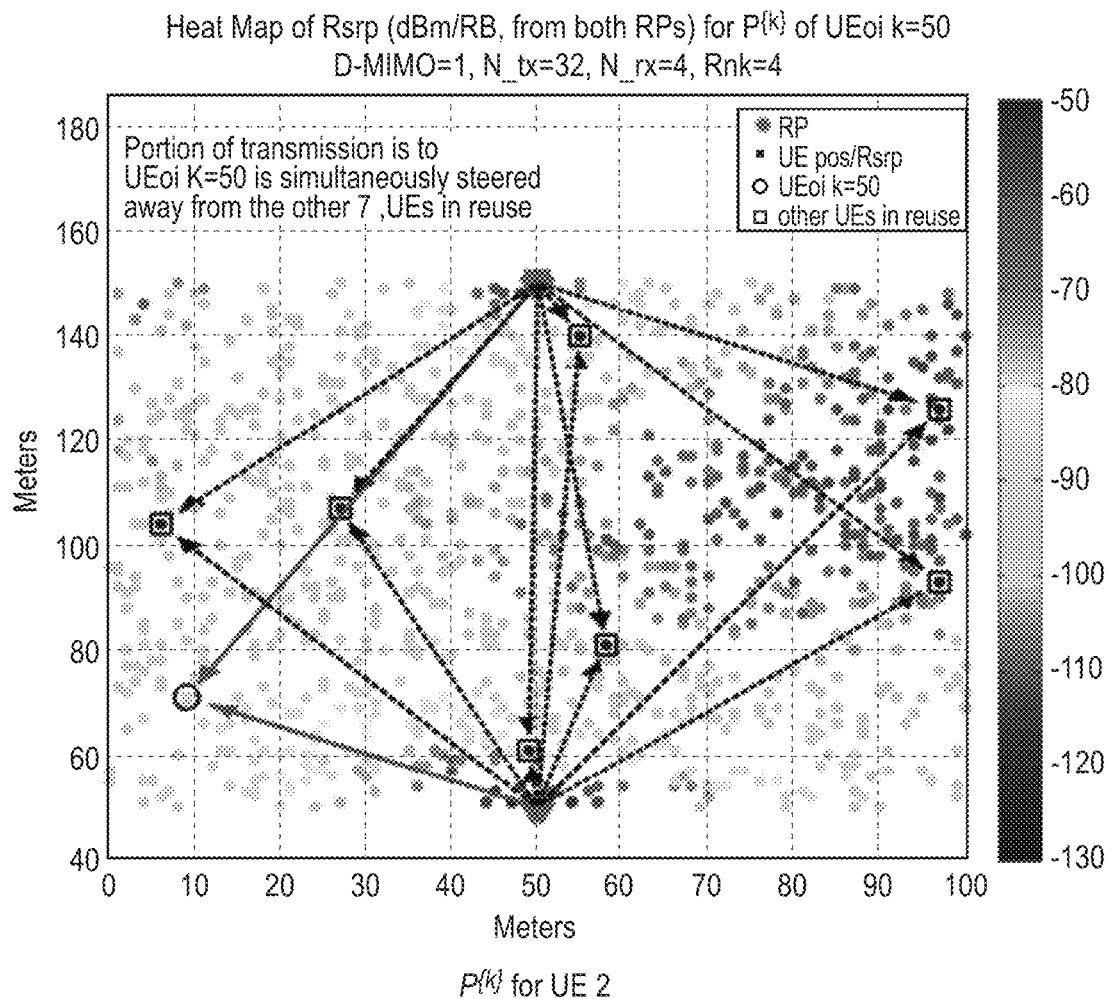
Figure 26:
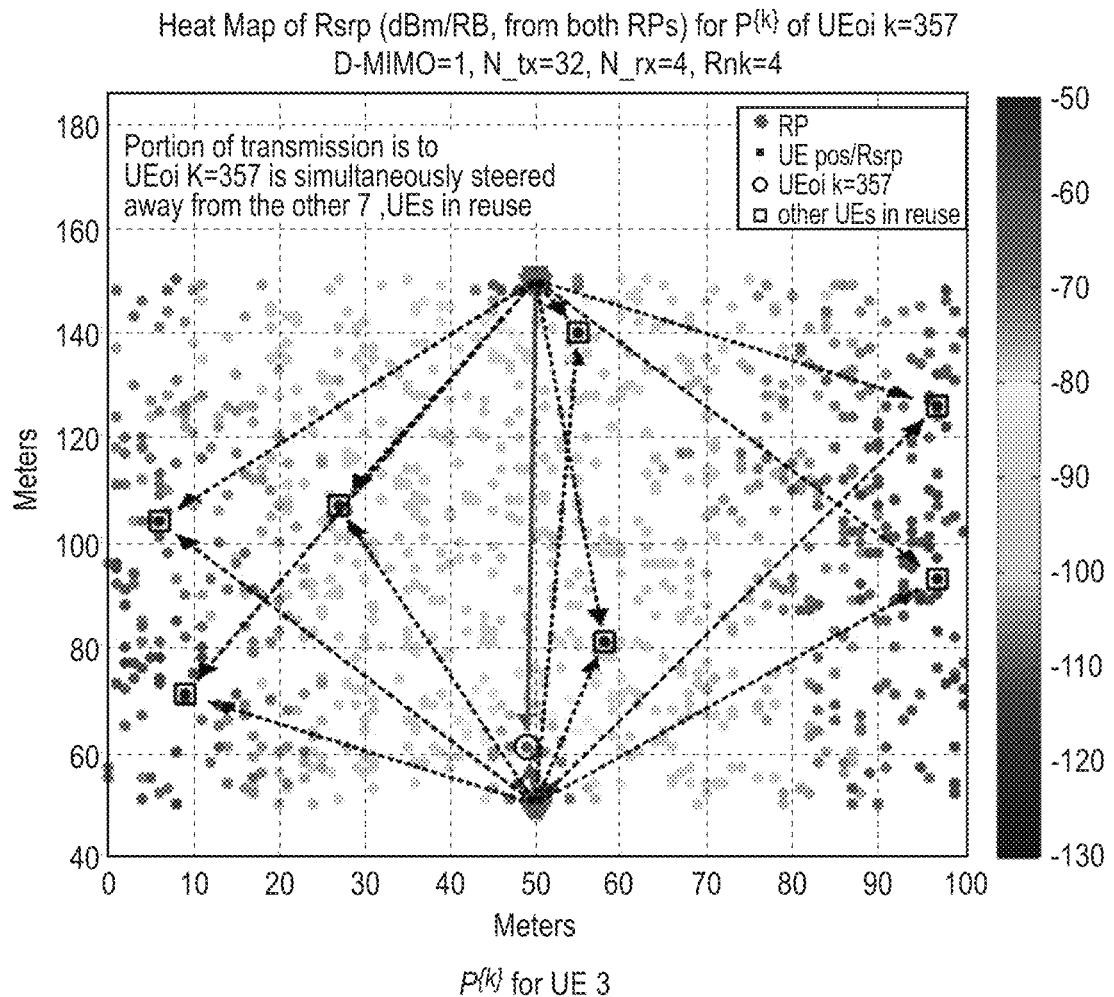
Figure 27:
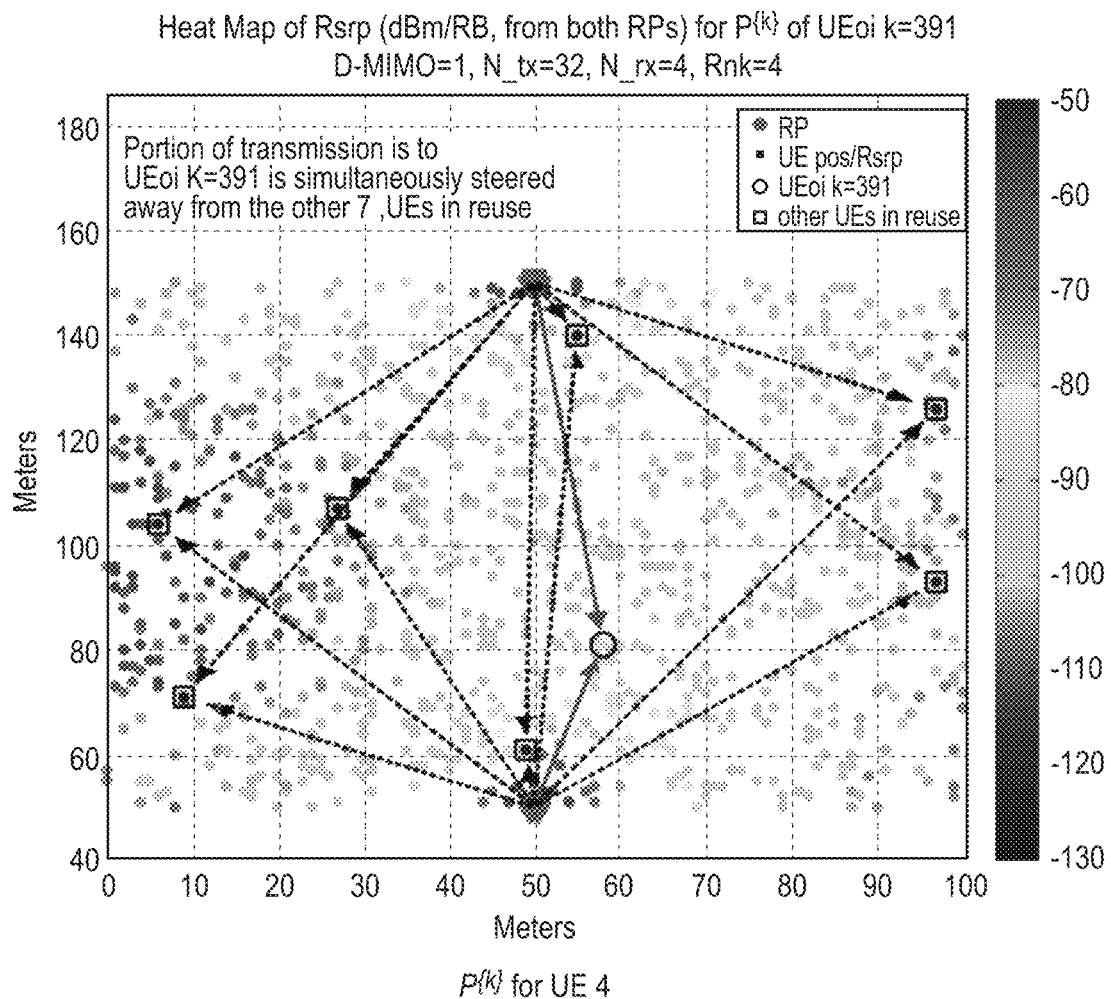
Figure 28:
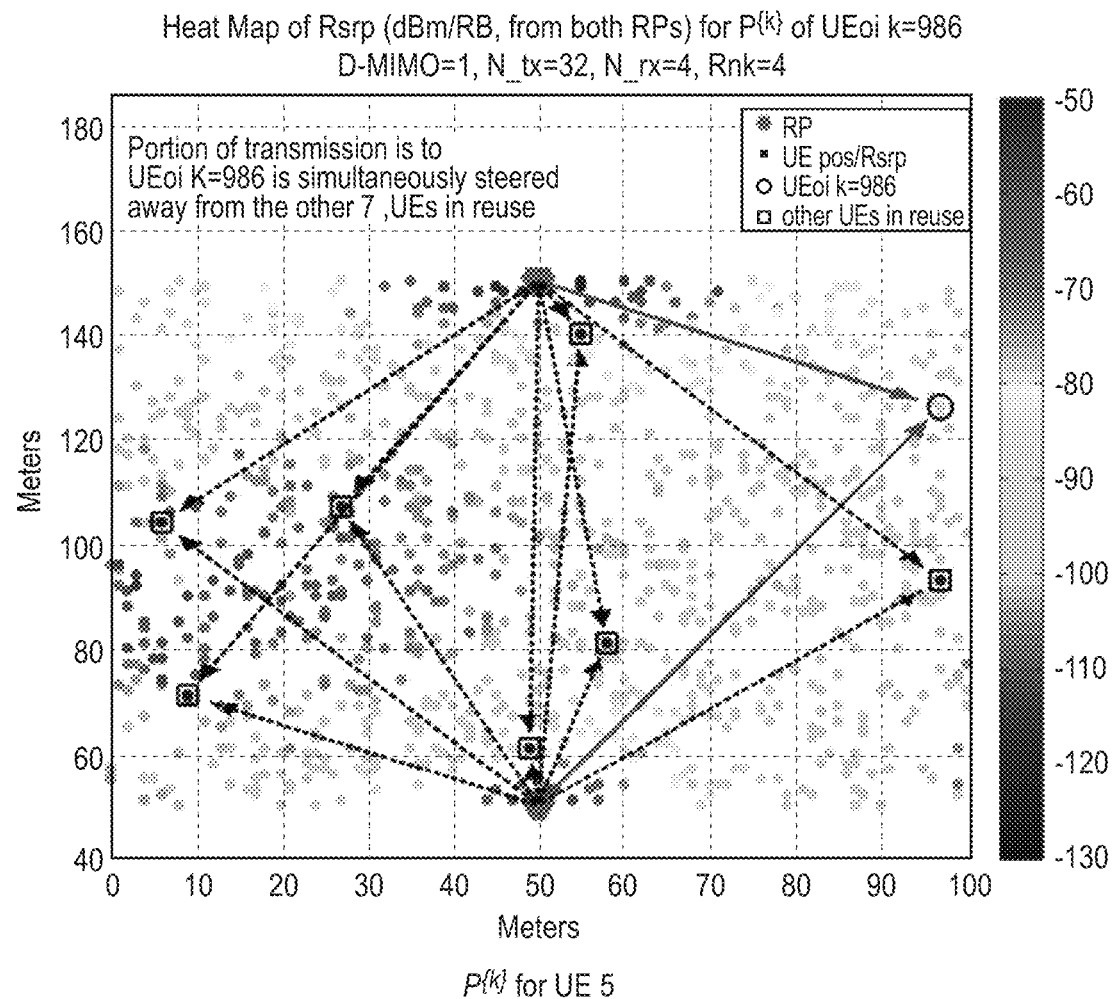
Figure 29:
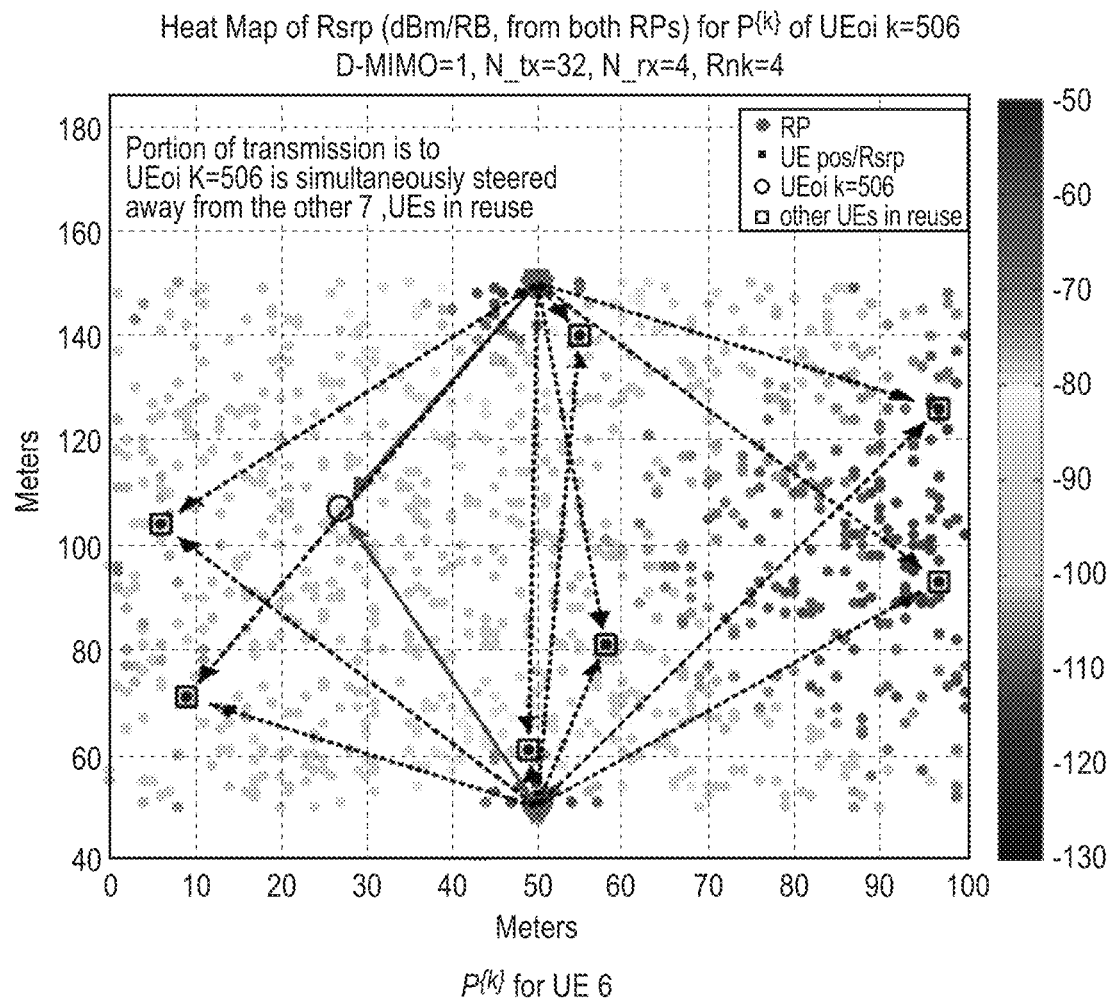
Figure 30:
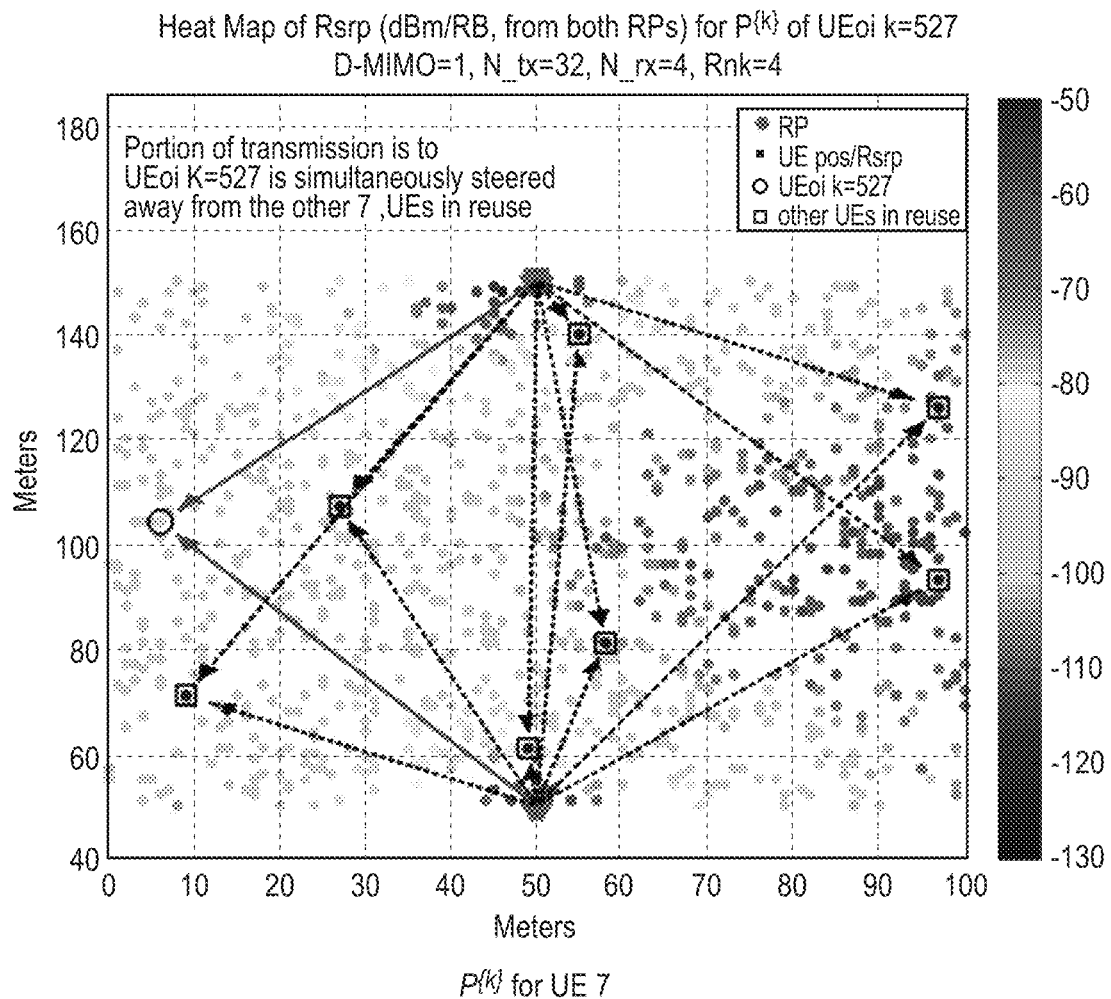
Figure 31:
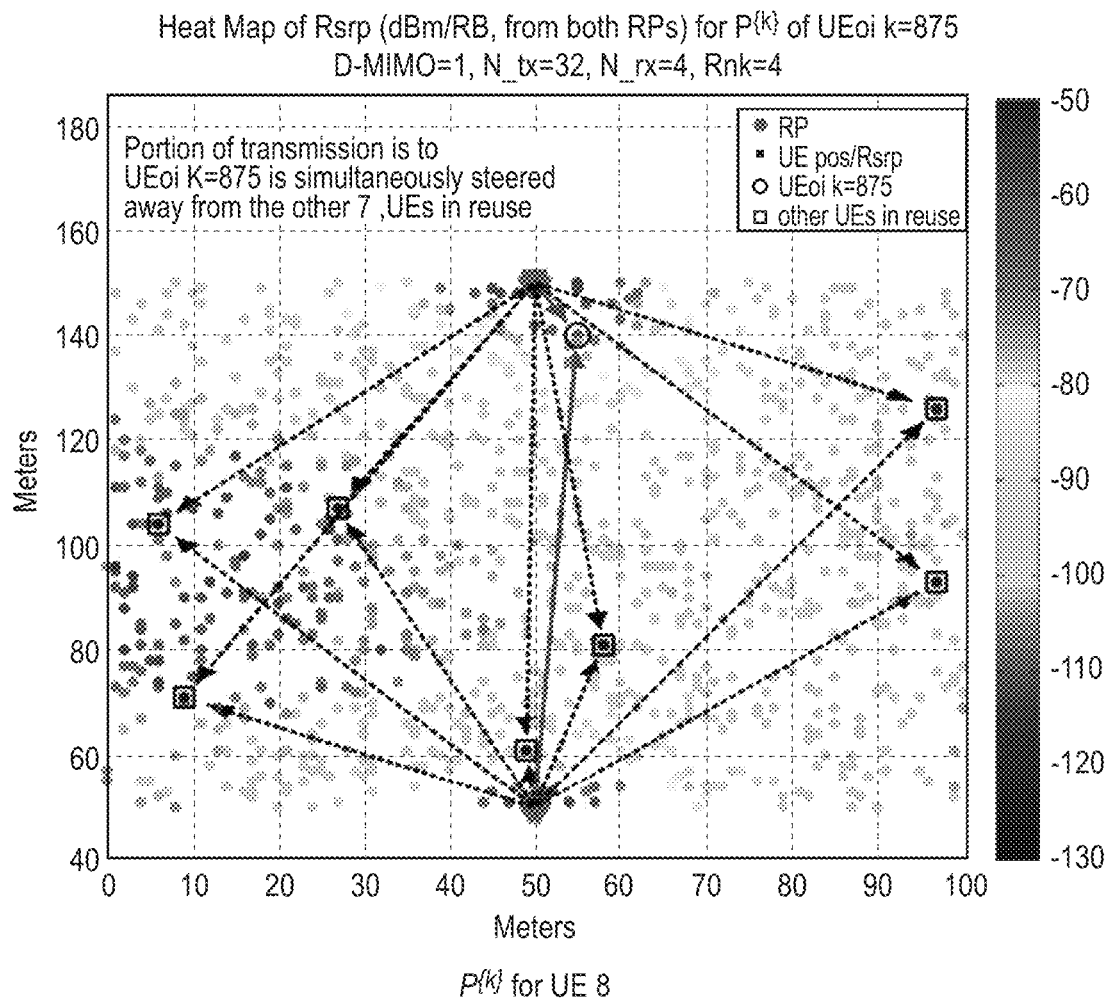
Figure 32:
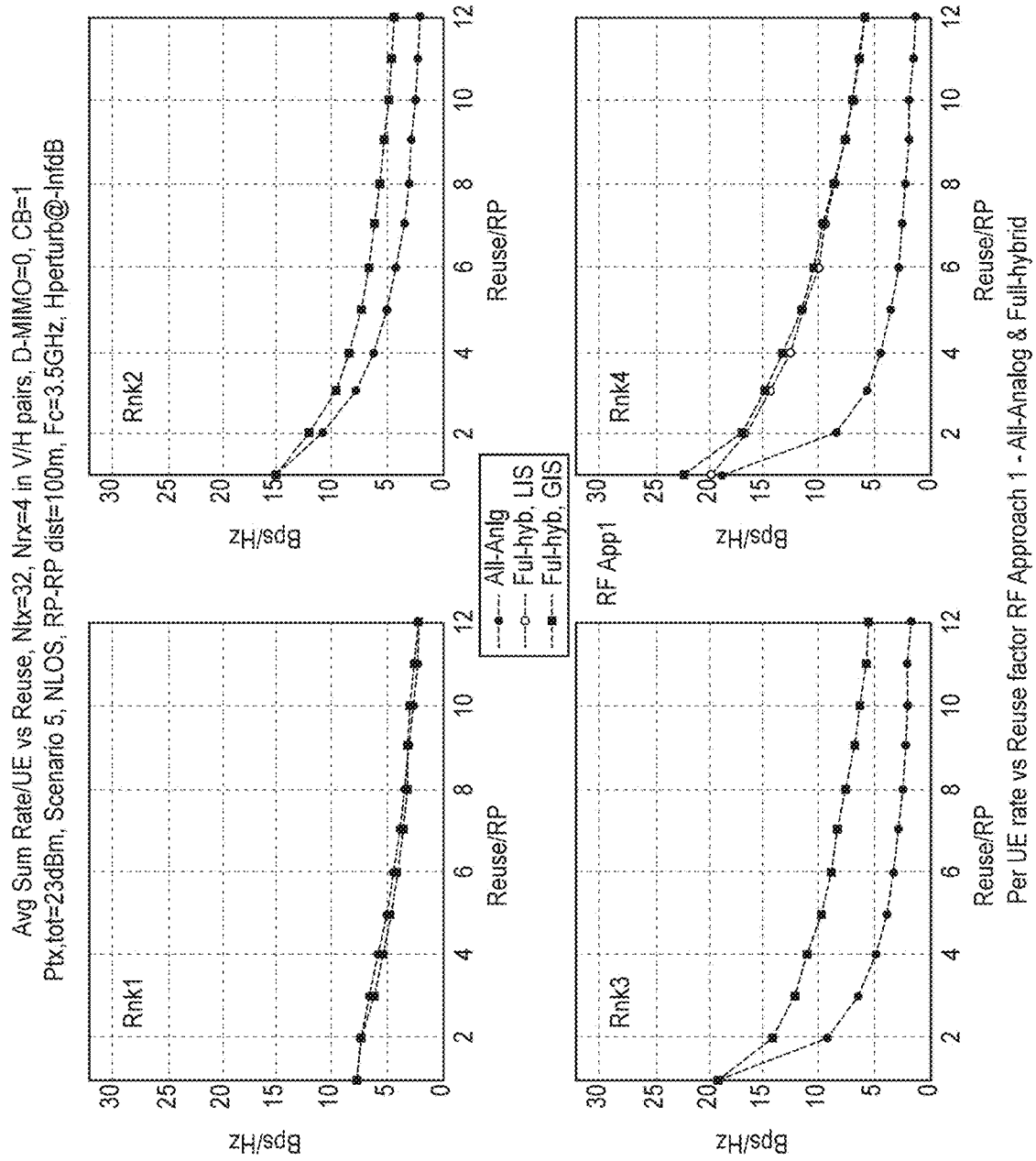
FIGS. 32-35 show results for RF approach 1.
Figure 33:
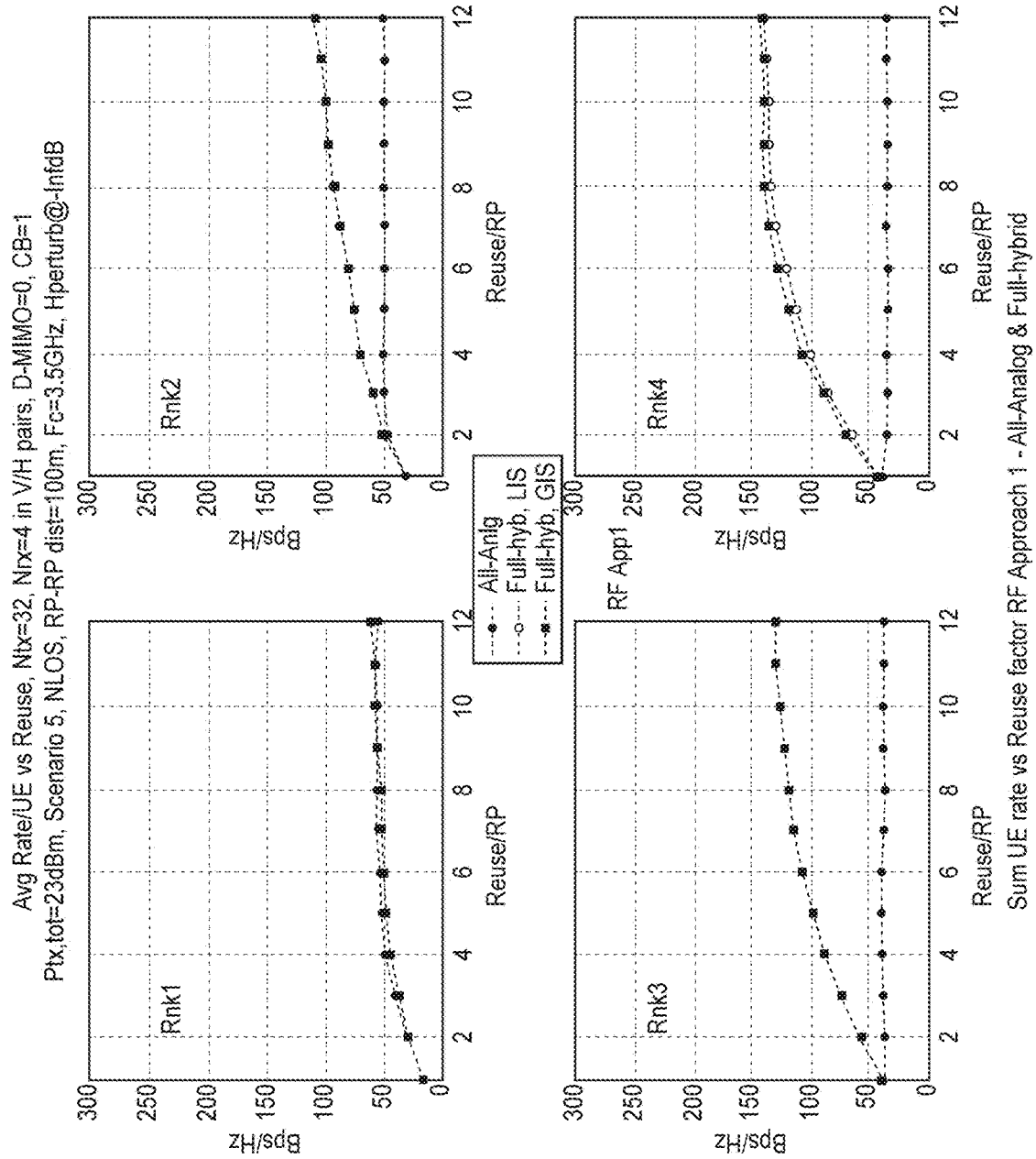
Figure 34:
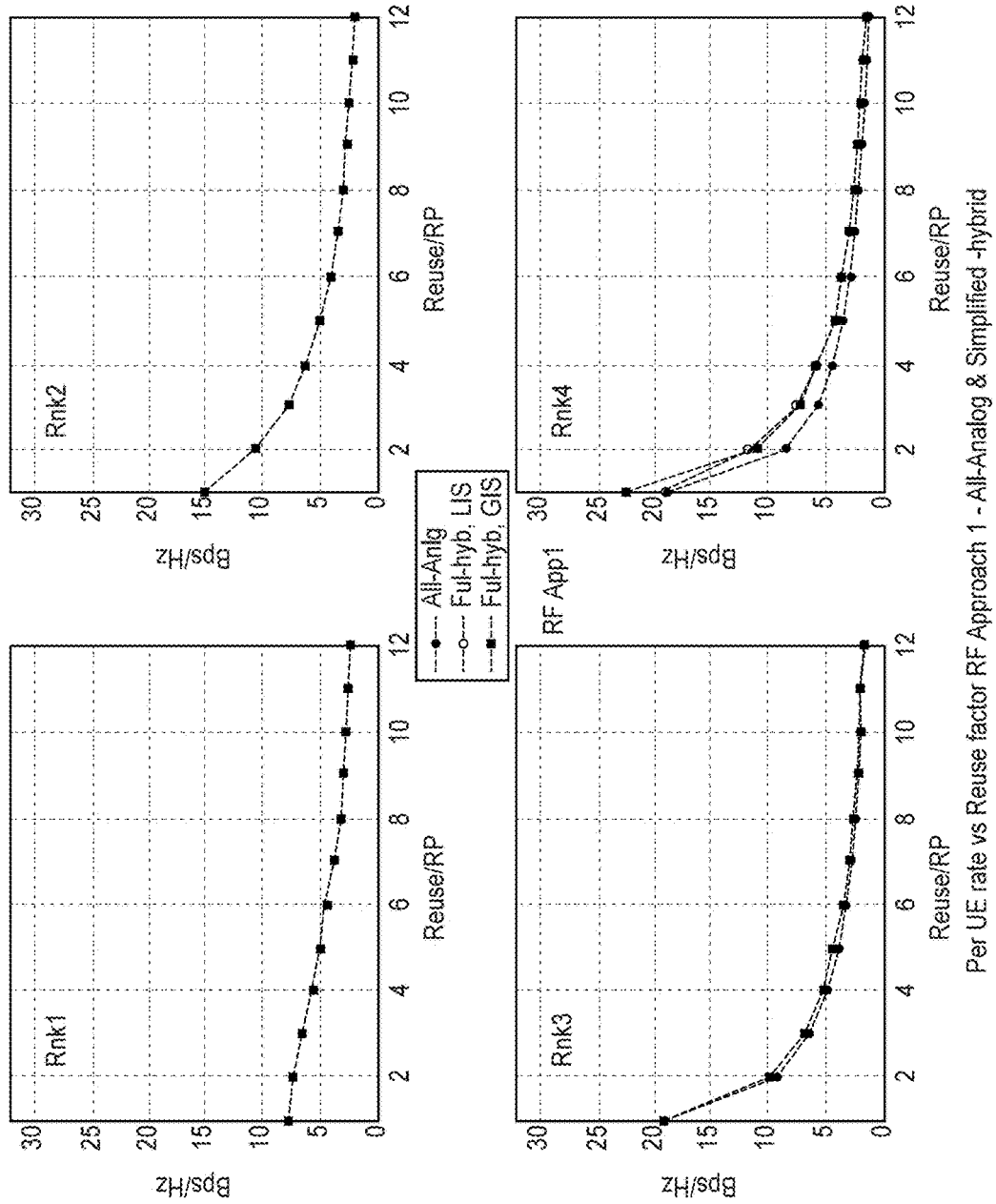

Both SVD-GIS and SVD-LIS offer significant improvement over direct SVD. Peak sum rate for SVD-GIS is 2X+ that for direct SVD, and peak rate for SVD-LIS is only somewhat less than that for SVD-GIS. Using capping for peak antenna element TX power results in small degradation for each of the three. FIGS. 6 and 7 show cumulative distribution functions (CDFs) associated with the scaling required for peak power capping.

FIGS. 10-13 show the corresponding results for D-MU-MIMO. It is seen that SVD-GIS has improved relative to direct SVD while SVD-LIS has degraded, compared to MU-MIMO. The penalty for peak power capping has increased somewhat for SVD-GIS, but is still relatively small.

FIGS. 16-23 compare the performances of D-MU-MIMO and MU-MIMO, for each of SVD-GIS, SVD-LIS, and direct SVD. There is not much difference in performance for direct-SVD, D-MU-MIMO vs MU-MIMO. The performance with D-MU-MIMO is much worse than that for MU-MIMO, for SVD-LIS, but is significantly better for SVD-GIS. The peak sum-rate with SVD-GIS/D-MU-MIMO is about 3.3× that for direct-SVD, while the peak rates for SVD-GIS/MU-MIMO and SVD-LIS/MU-MIMO are about 2.5× and 2× that for direct-SVD, respectively.

FIGS. 8-9 and 14-15 show the impact on performance when there are errors (perturbations) in the RPs' estimates of the channels $H^{\{k,m\}}$. An error is modeled as AWGN, uncorrelated with the channel, at a specified level below the average square value for the channel. Perturbation levels of −20 and −10 dB are considered. There is a significant reduction in rates for the perturbations, especially for the precoders with interference suppression. However, even with −10 dB perturbation, the precoders with interference suppression have significantly higher rates than direct-SVD precoders.

FIGS. 24-31 illustrate the reference signal receive power (Rsrp) heat maps for D-MU-MIMO with SVD-GIS, with no channel perturbations. There is one figure for each of 8 UEs in reuse, and the precoder for a given figure is that for the corresponding UE. Note that for a given UE of interest, the Rsrp is very low at the positions of the 7 other UEs in reuse, even if the other UEs are closer to their home RP than the UE of interest is to its home RP.

4. Hybrid Precoder Results

For the all-digital MU-MIMO precoding schemes discussed above, a separate RF chain is required for each antenna array element. To reduce the number of RF chains in the implementation, hybrid precoders have been considered whereby the precoder $P^{\{k,m\}}$ for UE k at RP m is implemented as the cascade $$P = P^{RF} P^{dig}, \quad (28)$$

where $P^{RF}$ has dimension $N_t \times M$ and $P^{dig}$ has dimension M×r. For this representation, M is the number of RF chains (virtual antenna ports), and typically $M < N_t$.

The matrix $P^{RF}$ is implemented with analog components, with a given column having unity magnitude elements with programmable phases, usually steering the array beam in a selected direction. The matrix $P^{dig}$ is implemented digitally, and its output $P^{dig} x^{\{k\}}$ provides the vector of M inputs for UE k to the beamformer $P^{RF}$. Given a choice for $P^{RF}$, it can be absorbed in the channels as $\tilde{H}^{\{k\}} = P^{RF} H^{\{k\}}$ and the analysis of the above sections repeated to determine optimum settings for $P^{dig}$.

For the simulation results below, the number of virtual input ports is M=rK, where as before K is the number of UEs in reuse, and r is the number of data streams (rank) per UE. Furthermore, we consider $P^{RF}$ whose columns consist of the Type-1 CB precoders of the 5G specification. In particular, the $N_t/2$ elements of a column corresponding to a given polarization have the form of a DFT vector, i.e., $p_n = \exp\{j2\pi\alpha n/(N_t/2)\}$, where vector p corresponds to the given polarization. The term α is a steering angle depending on the selected CB precoder and particular stream.

Note that $P^{RF}$ consists of K column-block submatrices each of dimension $N_t \times r$, and the kth block is the CB precoder p selected for UE k. The CB precoder p is selected with one of two approaches, each of which assumes an all-analog implementation:
1. RF approach 1: p is the CB precoder maximizing the rate for UE k in the absence of interference
2. RF approach 2: p is the CB precoder maximizing the signal-to-leakage noise ratio SINR of the sections above.

For the digital precoder $P^{dig}$, we consider three classes:
1. All-analog: $P^{dig}$ is all-zeros, except for the kth r×r row block, which is $I_{r \times r}$.
2. Simplified hybrid: $P^{dig}$ constrained to be all-zeros, except for the kth r×r row block selected to maximize SINR.
3. Full hybrid: $P^{dig}$ selected to maximize SINR.

Note that All-analog precoding is equivalent to CB precoding using the Type-1 CBs of the 5G spec.

Figure 36:
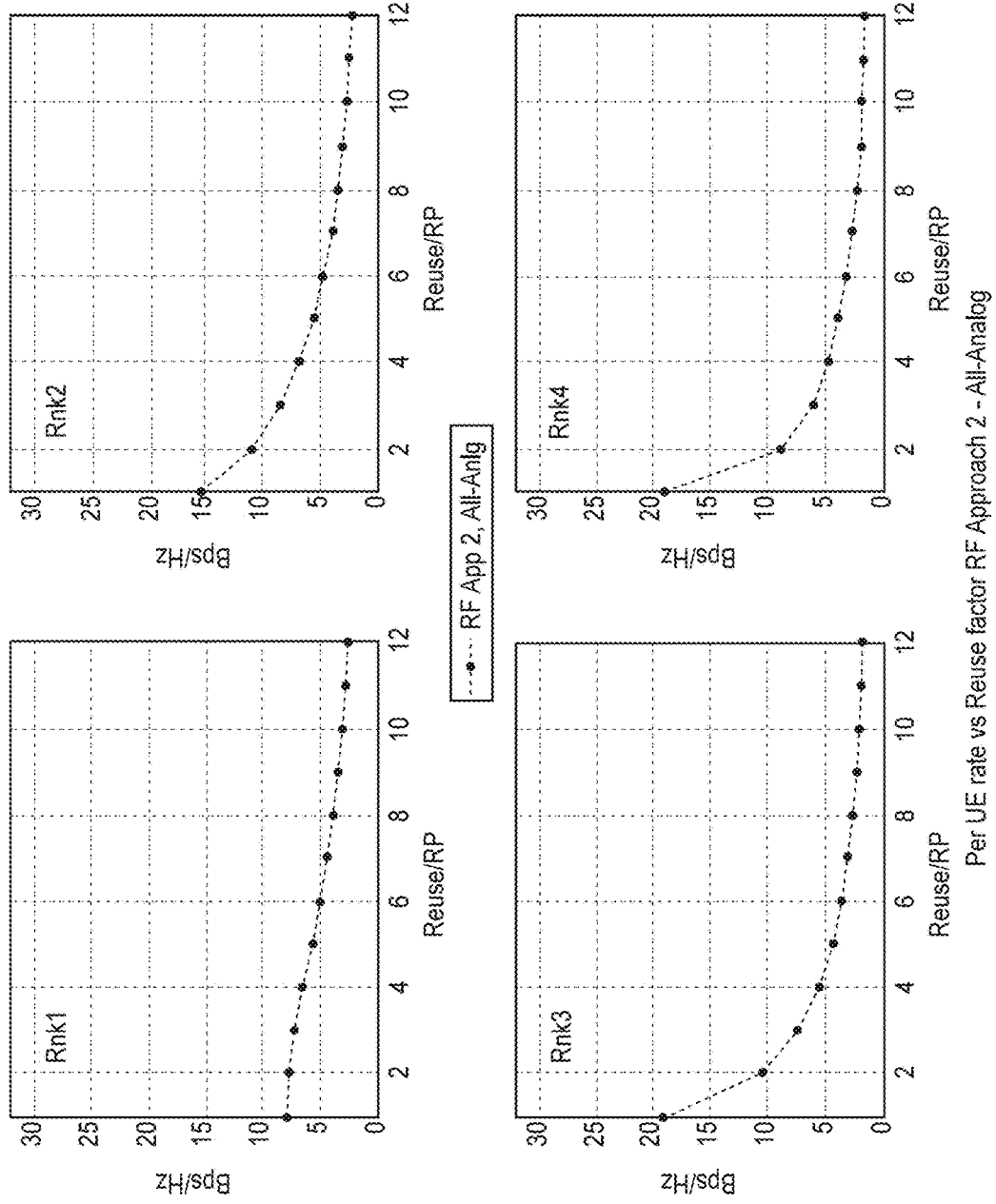
FIGS. 36 and 37 show results for RF approach 2.
Figure 37:
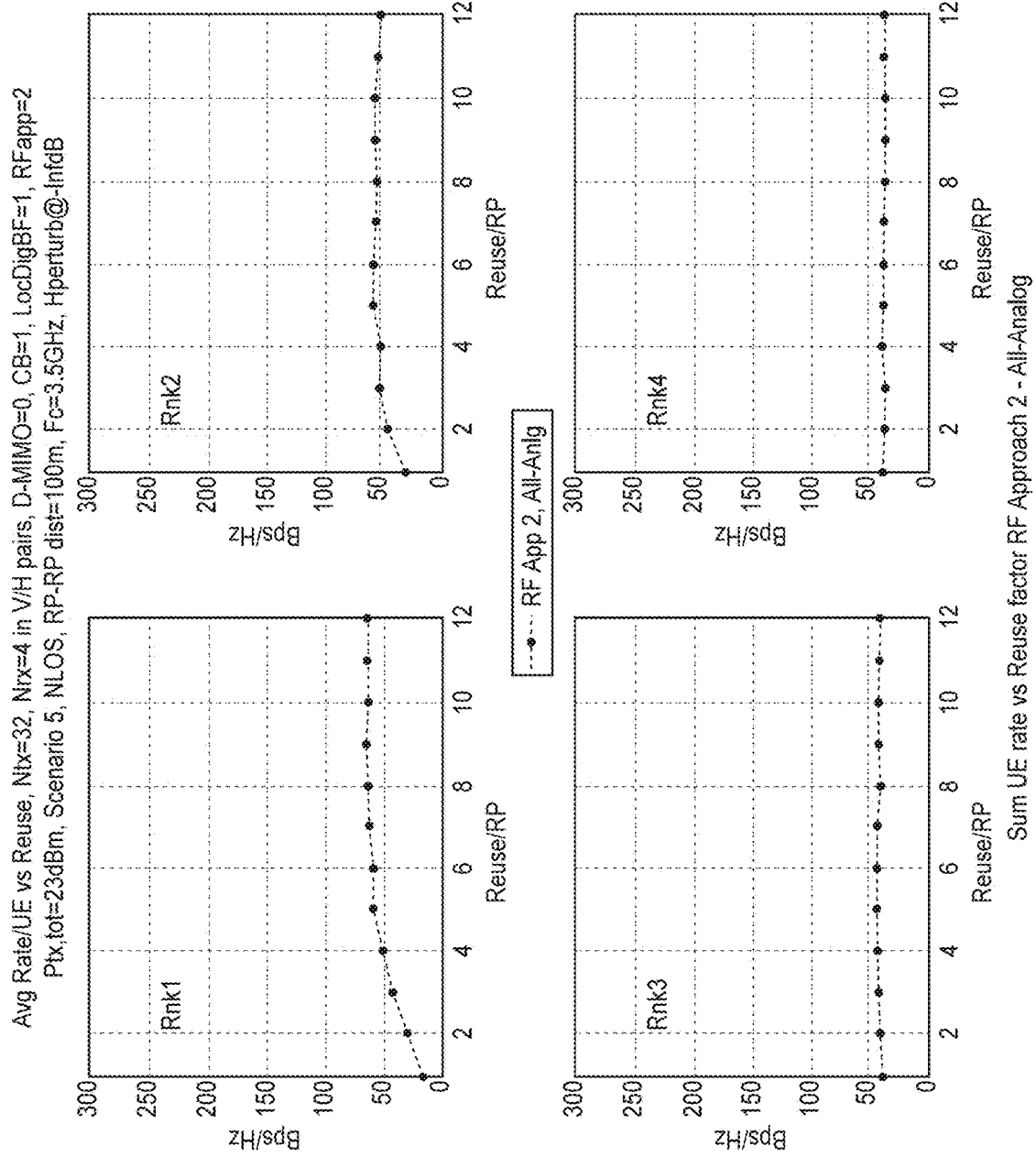

Only MU-MIMO (transmission from a single RP) is considered for the results of this section. FIGS. 32-35 show results for RF approach 1, and FIGS. 36-37 show results for RF approach 2. For RF approach 1, rates are shown comparing All-analog & Full-hybrid in FIGS. 32 and 33 and comparing All-analog & Simplified-hybrid in FIGS. 34 and 35.

Figure 35:
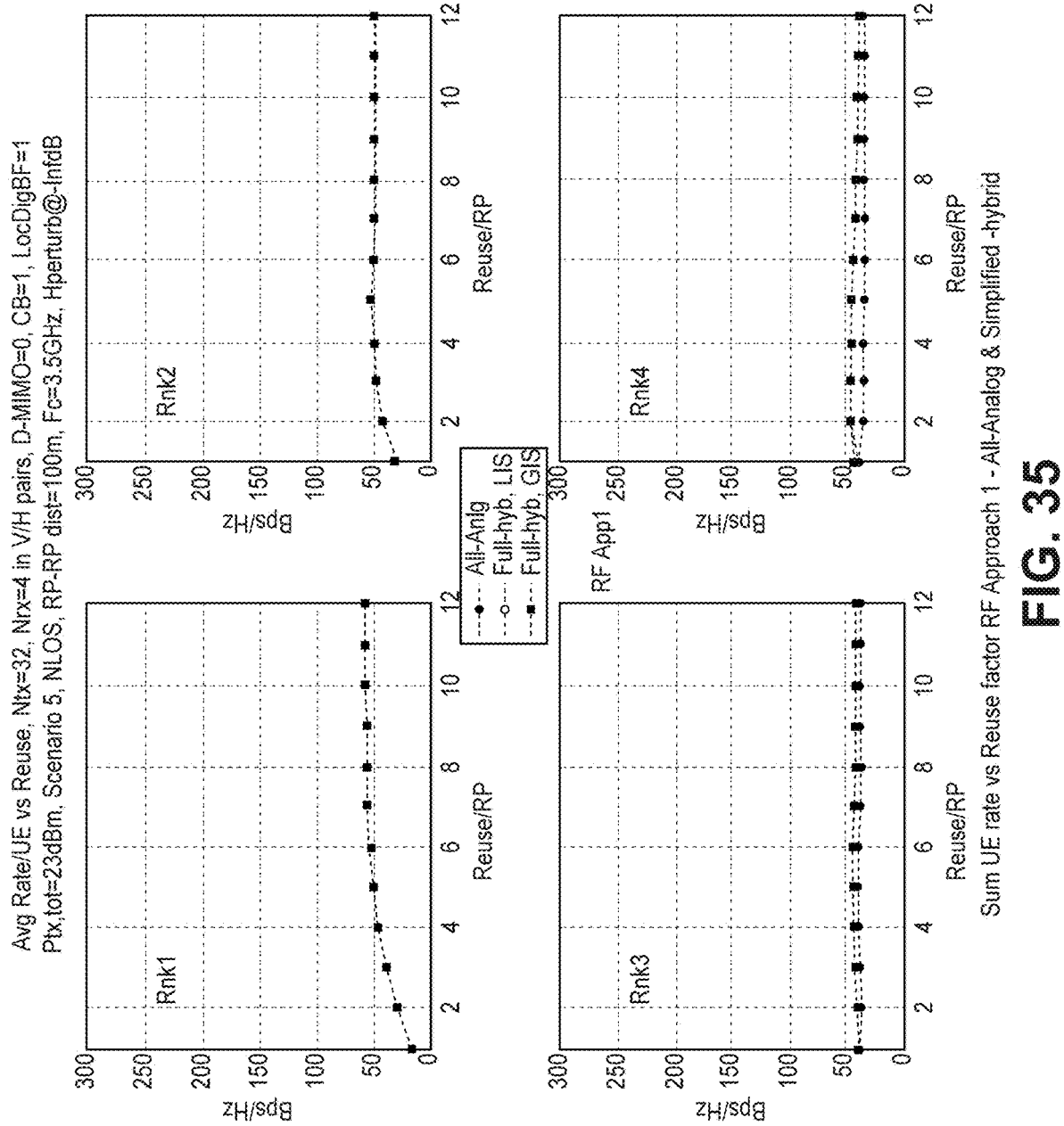

Comparing FIG. 35 with FIG. 37 we see that RF approach 2 offers only a small improvement over RF approach 1, for all-analog precoding. Note from FIG. 35 that with RF approach 1, simplified-hybrid precoder offers only a small improvement over all-analog precoding, which is most evident for rank 4. Note from comparing FIG. 33 with FIG. 35 that Full-hybrid precoding offers significantly higher rates than Simplified-hybrid precoding, but that GIS (interference suppression for all UEs) is only a little better than LIS (interference suppression for same-RP UEs only), and that only for rank 4.

Figure 38:
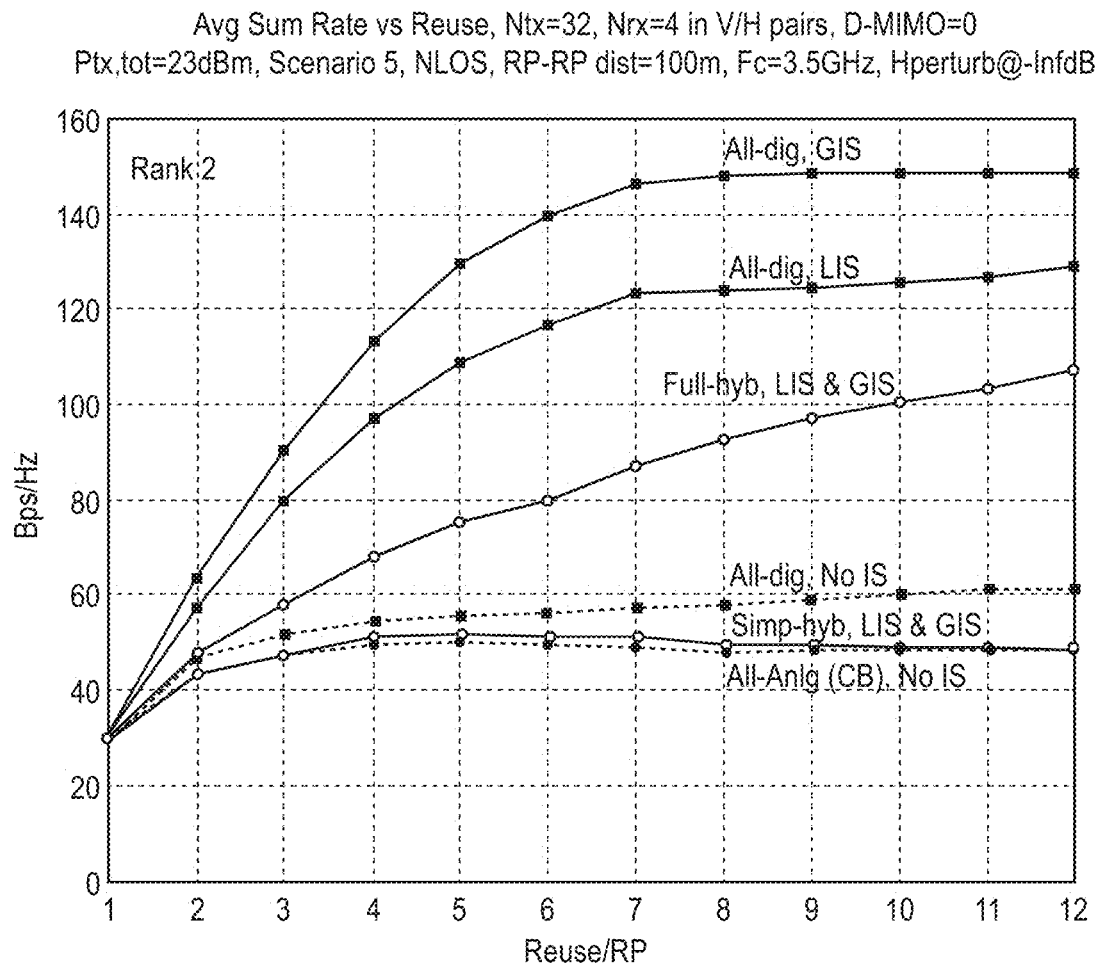
FIG. 38 is a comparison of sum-rate for All-analog (CB) precoding and hybrid precoding (RF approach 1) with All-digital precoding, in all cases for rank 2.

FIG. 38 compares sum-rate for All-analog (CB) and hybrid precoding (RF approach 1) with All-digital precoding, for rank 2. As noted previously, Simplified hybrid precoding is only slightly better than all-analog precoding. All-digital offers a significant advantage over both, even when not using interference suppression (IS). Full-hybrid precoding offers a significant advantage over all the aforementioned, but offers much less sum-rate than All-digital precoding.

C. CONCLUSION

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

Example Embodiments

Example 1 includes a base station system to provide wireless service to a plurality of items of user equipment (UEs), the system comprising: a plurality of radio units, each of the radio units comprising a respective array of antennas for wirelessly transmitting and receiving radio frequency signals with UE; wherein the system is configured to use multi-user multi-input-multiple-output (MU-MIMO) to communicate with the UEs; and wherein the system is configured to use a precoder scheme employing interference suppression (IS).

Example 2 includes the system of Example 1, wherein the interference suppression comprises local interference suppression.

Example 3 includes the system of any of Examples 1-2, wherein the interference suppression comprises global interference suppression.

Example 4 includes the system of any of Examples 1-3, wherein the system is configured to, for a given time and frequency resource, use MU-MIMO to communicate with each of multiple subsets of the UEs using only a respective one of the radio units that is only used to communicate with that subset of the UEs during the given time and frequency resource.

Example 5 includes the system of any of Examples 1-4, wherein the system is configured to, for a given time and frequency resource, use distributed MU-MIMO (D-MU-MIMO) to communicate with a subset of the UEs using multiple radio units.

Example 6 includes the system of any of Examples 1-5, wherein the system is configured to use all digital precoding.

Example 7 includes the system of any of Examples 1-6, wherein the system is configured to use all analog precoding.

Example 8 includes the system of any of Examples 1-7, wherein the system is configured to use hybrid precoding comprising digital precoding and analog precoding.

Example 9 includes the system of Example 8, wherein the system is configured to use simplified hybrid precoding, wherein elements of a digital precoding matrix are constrained to all be zeros except for a block selected to maximize SINR.

Example 10 includes the system of any of Examples 8-9, wherein the system is configured to use full hybrid precoding, wherein a digital precoding matrix is configured to maximize SINR.

Example 11 includes the system of any of Examples 1-10, where the system is configured to cap peak power at each of the antennas by scaling elements of a precoder matrix.

Example 12 includes the system of any of Examples 1-11, wherein the system is configured so that the precoder scheme is robust to errors in channel estimates used by the system.

Example 13 includes the system of any of Examples 1-12, wherein the system is configured to use the precoder scheme for downlink transmissions.

Example 14 includes the system of any of Examples 1-13, wherein the system is configured to use the precoder scheme for uplink transmissions.

Example 15 includes a method of wirelessly communicating with a plurality of items of user equipment (UEs) using a plurality of radio units, each of the radio units comprising a respective array of antennas for wirelessly transmitting and receiving radio frequency signals with the UEs, the method comprising: precoding data streams communicated with UEs using an interference suppression (IS) precoding scheme; and wirelessly communicating the precoded data streams with the UEs using multi-user multi-input-multiple-output (MU-MIMO).

Example 16 includes the method of Example 15, wherein the interference suppression precoding scheme comprises a local interference suppression precoding scheme.

Example 17 includes the method of any of Examples 15-16, wherein the interference suppression precoding scheme comprises a global interference suppression precoding scheme.

Example 18 includes the method of any of Examples 15-17, wherein wirelessly communicating the precoded data streams with the UEs using MU-MIMO comprises, for a given time and frequency resource, using MU-MIMO to communicate with each of multiple subsets of the UEs using only a respective one of the radio units that is only used to communicate with that subset of the UEs during the given time and frequency resource.

Example 19 includes the method of any of Examples 15-18, wherein wirelessly communicating the precoded data streams with the UEs using MU-MIMO comprises, for a given time and frequency resource: using distributed MU-MIMO (D-MU-MIMO) to communicate with a subset of the UEs using multiple radio units.

Example 20 includes the method of any of Examples 15-19, wherein precoding data streams communicated with UEs using an interference suppression precoding scheme comprises: using all digital precoding.

Example 21 includes the method of any of Examples 15-20, wherein precoding data streams communicated with UEs using an interference suppression precoding scheme comprises: using all analog precoding.

Example 22 includes the method of any of Examples 15-21, wherein precoding data streams communicated with UEs using an interference suppression precoding scheme comprises: using hybrid precoding comprising digital precoding and analog precoding.

Example 23 includes the method of Example 22, wherein using hybrid precoding comprises using simplified hybrid precoding, wherein elements of a digital precoding matrix are constrained to all be zeros except for a block selected to maximize SINR.

Example 24 includes the method of any of Examples 22-23, wherein using hybrid precoding comprises using full hybrid precoding, wherein a digital precoding matrix is configured to maximize SINR.

Example 25 includes the method of any of Examples 15-24, further comprising capping peak power at each of the antennas by scaling elements of a precoder matrix.

Example 26 includes the method of any of Examples 15-25, wherein the precoder scheme is robust to errors in channel estimates used by the system.

Example 27 includes the method of any of Examples 15-26, wherein wirelessly communicating the precoded data streams with the UEs using MU-MIMO comprises wirelessly communicating the precoded data streams in a downlink to the UEs using MU-MIMO.

Example 28 includes the method of any of Examples 15-27, wherein wirelessly communicating the precoded data streams with the UEs using MU-MIMO comprises wirelessly communicating the precoded data streams in an uplink from the UEs using MU-MIMO.

What is claimed is:

1. A base station system to provide wireless service to a plurality of items of user equipment (UEs), the base station system comprising:
   a plurality of radio units associated with a same at least one cell, each of the plurality of radio units comprising a respective array of antennas for wirelessly transmitting and receiving radio frequency signals with UE; and
   wherein the base station system is configured to use multi-user multi-input- multiple-output (MU-MIMO) to communicate with the UEs;
   wherein the plurality of radio units are configured to use a precoder scheme employing interference suppression (IS) in their downlink transmissions.

2. The base station system of claim 1, wherein the interference suppression comprises local interference suppression.

3. The base station system of claim 1, wherein the interference suppression comprises global interference suppression.

4. The base station system of claim 1, wherein the base station system is configured to, for a given time and frequency resource, use MU-MIMO to communicate with each of multiple subsets of the UEs using only a respective one of the plurality of radio units that is only used to communicate with that subset of the UEs during the given time and frequency resource.

5. The base station system of claim 1, wherein the base station system is configured to, for a given time and frequency resource, use distributed MU-MIMO (D-MU-MIMO) to communicate with a subset of the UEs using multiple radio units.

6. The base station system of claim 1, wherein the base station system is configured to use all digital precoding.

7. The base station system of claim 1, wherein the base station system is configured to use all analog precoding.

8. The base station system of claim 1, wherein the base station system is configured to use hybrid precoding comprising digital precoding and analog precoding.

9. The base station system of claim 8, wherein the base station system is configured to use simplified hybrid precoding, wherein elements of a digital precoding matrix are constrained to all be zeros except for a block selected to maximize SINR.

10. The base station system of claim 8, wherein the base station system is configured to use full hybrid precoding, wherein a digital precoding matrix is configured to maximize SINR.

11. The base station system of claim 1, where the base station system is configured to cap peak power at each of the antennas by scaling elements of a precoder matrix.

12. The base station system of claim 1, wherein the base station system is configured so that the precoder scheme is robust to errors in channel estimates used by the base station system.

13. The base station system of claim 1, wherein the base station system is configured to use the precoder scheme for uplink transmissions.

14. A method of wirelessly communicating with a plurality of items of user equipment (UEs) using a plurality of radio units, each of the plurality of radio units comprising a respective array of antennas for wirelessly transmitting and receiving radio frequency signals with the UEs, the method comprising:
   precoding data, at the plurality of radio units, streams communicated with UEs using an interference suppression (IS) precoding scheme in their downlink transmissions; and
   wirelessly communicating the precoded data streams with the UEs using multi-user multi-input-multiple-output (MU-MIMO);
   wherein each of the plurality of radio units is associated with a same at least one cell.

15. The method of claim 14, wherein the interference suppression precoding scheme comprises a local interference suppression precoding scheme.

16. The method of claim 14, wherein the interference suppression precoding scheme comprises a global interference suppression precoding scheme.

17. The method of claim 14, wherein wirelessly communicating the precoded data streams with the UEs using MU-MIMO comprises, for a given time and frequency resource, using MU-MIMO to communicate with each of multiple subsets of the UEs using only a respective one of the plurality of radio units that is only used to communicate with that subset of the UEs during the given time and frequency resource.

18. The method of claim 14, wherein wirelessly communicating the precoded data streams with the UEs using MU-MIMO comprises, for a given time and frequency resource:
   using distributed MU-MIMO (D-MU-MIMO) to communicate with a subset of the UEs using multiple radio units.

19. The method of claim 14, wherein precoding data streams communicated with UEs using an interference suppression precoding scheme comprises:
   using all digital precoding.

20. The method of claim 14, wherein precoding data streams communicated with UEs using an interference suppression precoding scheme comprises:
   using all analog precoding.

21. The method of claim 14, wherein precoding data streams communicated with UEs using an interference suppression precoding scheme comprises:
using hybrid precoding comprising digital precoding and analog precoding.

22. The method of claim 21, wherein using hybrid precoding comprises using simplified hybrid precoding, wherein elements of a digital precoding matrix are constrained to all be zeros except for a block selected to maximize SINR.

23. The method of claim 21, wherein using hybrid precoding comprises using full hybrid precoding, wherein a digital precoding matrix is configured to maximize SINR.

24. The method of claim 4, further comprising capping peak power at each of the antennas by scaling elements of a precoding matrix.

25. The method of claim 14, wherein the precoder scheme is robust to errors in channel estimates used by the plurality of radio units.

26. The method of claim 14, wherein wirelessly communicating the precoded data streams with the UEs using MU-MIMO comprises wirelessly communicating the precoded data streams in an uplink from the UEs using MU-MIMO.

* * * * *